(12) United States Patent
Lim et al.

(10) Patent No.: US 12,708,143 B2
(45) Date of Patent: Aug. 18, 2026

(54) AEROSOL GENERATING DEVICE AND METHOD FOR PROVIDING ADAPTIVE FEEDBACK THROUGH PUFF RECOGNITION

(71) Applicant: KT&G CORPORATION, Daejeon (KR)

(72) Inventors: Hun Il Lim, Seoul (KR); Jong Sub Lee, Seongnam-si (KR); Dae Nam Han, Daejeon (KR); Jang Uk Lee, Seoul (KR); Jung Ho Han, Daejeon (KR); Jin Young Yoon, Seoul (KR); Young Lea Kim, Seoul (KR); Ji Soo Jang, Seoul (KR); Wang Seop Lim, Anyang-si (KR); Moon Bong Lee, Seoul (KR); Soung Ho Ju, Daejeon (KR); Du Jin Park, Seoul (KR); Seong Won Yoon, Yongin-si (KR)

(73) Assignee: KT&G CORPORATION, Daejeon (KR)

( * ) Notice: Subject to any disclaimer, the term of this patent is extended or adjusted under 35 U.S.C. 154(b) by 298 days.

(21) Appl. No.: 18/341,298

(22) Filed: Jun. 26, 2023

(65) Prior Publication Data

US 2023/0329352 A1 Oct. 19, 2023

Related U.S. Application Data

(63) Continuation of application No. 16/604,420, filed as application No. PCT/KR2018/004118 on Apr. 9, 2018, now Pat. No. 12,102,131.

(30) Foreign Application Priority Data

Apr. 11, 2017 (KR) ........................ 10-2017-0046938
Jun. 19, 2017 (KR) ........................ 10-2017-0077586
Jul. 3, 2017 (KR) ........................ 10-2017-0084389

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/40* (2020.01); *A24F 40/48* (2020.01);
(Continued)

(58) Field of Classification Search
None
See application file for complete search history.

(56) References Cited

U.S. PATENT DOCUMENTS 2,638,904 A 5/1953 Mitchell
4,585,014 A 4/1986 Fry
(Continued)

FOREIGN PATENT DOCUMENTS

CA 2 973 143 A1 8/2016
CA 2 975 654 A1 8/2016
(Continued)

OTHER PUBLICATIONS

US 11,089,812 B2, 08/2021, Zuber et al. (withdrawn)
(Continued)

*Primary Examiner* — Cynthia Szewczyk
(74) *Attorney, Agent, or Firm* — Sughrue Mion, PLLC

(57) ABSTRACT

Provided is a device including: a battery configured to supply power; a heater configured to heat an aerosol generating material by receiving power from the battery; a sensor; at least one output unit; and a controller, wherein the controller detects a user's puff by using the sensor and controls at least one output unit based on puff characteristic data based on a result of the detection.

9 Claims, 27 Drawing Sheets

(51) Int. Cl.
*A24F 40/40* (2020.01)
*A24F 40/48* (2020.01)
*A24F 40/50* (2020.01)
*A24F 40/51* (2020.01)
*A24F 40/53* (2020.01)
*A24F 40/57* (2020.01)
*A24F 40/60* (2020.01)
*A24F 40/85* (2020.01)
*A24F 40/90* (2020.01)
*A46B 15/00* (2006.01)
*H02J 7/70* (2026.01)
*H05B 3/03* (2006.01)
*H05B 3/06* (2006.01)
*A24D 1/20* (2020.01)

(52) U.S. Cl.
CPC .............. *A24F 40/50* (2020.01); *A24F 40/51* (2020.01); *A24F 40/53* (2020.01); *A24F 40/57* (2020.01); *A24F 40/60* (2020.01); *A24F 40/85* (2020.01); *A24F 40/90* (2020.01); *A46B 15/0055* (2013.01); *A46B 15/0097* (2013.01); *H02J 7/731* (2026.01); *H05B 3/03* (2013.01); *H05B 3/06* (2013.01); *A24D 1/20* (2020.01); *A46B 2200/3013* (2013.01)

(56) References Cited

U.S. PATENT DOCUMENTS 4,637,407 A 1/1987 Bonanno et al.
5,144,962 A 9/1992 Counts et al.
5,240,012 A 8/1993 Ehrman et al.
5,249,586 A 10/1993 Morgan et al.
5,369,723 A 11/1994 Counts et al.
5,388,594 A 2/1995 Counts et al.
5,465,738 A 11/1995 Rowland
5,479,948 A 1/1996 Counts et al.
5,499,636 A 3/1996 Baggett, Jr. et al.
5,567,286 A 10/1996 Pal et al.
5,591,368 A 1/1997 Fleischhauer et al.
5,666,977 A 9/1997 Higgins et al.
5,666,978 A 9/1997 Counts et al.
5,878,752 A 3/1999 Adams et al.
5,967,148 A 10/1999 Harris et al.
6,040,560 A 3/2000 Fleischhauer et al.
6,053,176 A 4/2000 Adams et al.
6,418,938 B1 7/2002 Fleischhauer et al.
6,532,965 B1 3/2003 Abhulimen et al.
6,615,840 B1 9/2003 Fournier et al.
6,810,883 B2 11/2004 Felter et al.
7,861,726 B1 1/2011 Lukasavitz
8,375,959 B2 2/2013 Dittrich et al.
8,419,085 B2 4/2013 Kim et al.
8,464,726 B2 6/2013 Sebastian et al.
8,752,545 B2 6/2014 Buchberger
8,851,081 B2 10/2014 Fernando et al.
8,973,587 B2 3/2015 Liu
9,078,472 B2 7/2015 Liu
9,078,473 B2 7/2015 Worm et al.
9,115,471 B2 8/2015 Zitturi et al.
9,220,304 B2 12/2015 Greim
9,271,528 B2 3/2016 Liu
9,301,548 B2 4/2016 Liu
9,320,299 B2 4/2016 Hearn et al.
9,423,152 B2 8/2016 Ampolini et al.
9,427,023 B2 8/2016 Liu
9,439,453 B2 9/2016 Conner et al.
9,497,991 B2 11/2016 Besso et al.
9,499,332 B2 11/2016 Fernando et al.
9,504,279 B2 11/2016 Chen
9,516,899 B2 12/2016 Plojoux et al.
9,532,603 B2 1/2017 Plojoux et al.
9,560,883 B2 2/2017 Hawes
9,603,388 B2 3/2017 Fernando et al.
9,655,383 B2 5/2017 Holzherr et al.
9,693,587 B2 7/2017 Plojoux et al.
9,723,871 B2 8/2017 Xiang
9,795,166 B2 10/2017 Liu
9,814,263 B2 11/2017 Cochand et al.
9,854,841 B2 1/2018 Ampolini et al.
9,854,845 B2 1/2018 Plojoux et al.
9,894,934 B2 2/2018 Li et al.
9,903,071 B2 2/2018 Kominami
9,912,955 B2 3/2018 Song et al.
9,918,494 B2 3/2018 Mironov et al.
9,955,724 B2 5/2018 Lord
9,986,760 B2 6/2018 Macko et al.
9,999,247 B2 6/2018 Ruscio et al.
10,015,990 B2 7/2018 Mironov
10,031,183 B2 7/2018 Novak, III et al.
10,070,667 B2 9/2018 Lord et al.
10,104,911 B2 10/2018 Thorens et al.
10,130,780 B2 11/2018 Talon
10,136,673 B2 11/2018 Mironov
10,159,283 B2 12/2018 Mironov
10,194,697 B2 2/2019 Fernando et al.
10,299,513 B2 5/2019 Perez et al.
10,368,584 B2 8/2019 Fernando et al.
10,439,419 B2 10/2019 Bernauer et al.
10,440,987 B2 10/2019 Zeng et al.
10,448,670 B2 10/2019 Talon et al.
10,492,542 B1 12/2019 Worm et al.
10,548,350 B2 2/2020 Greim et al.
10,555,553 B2 2/2020 Binassi et al.
10,555,555 B2 2/2020 Fernando et al.
10,588,351 B2 3/2020 Ricketts
10,617,149 B2 4/2020 Malgat et al.
10,645,971 B2 5/2020 Zitzke
10,668,058 B2 6/2020 Rose et al.
10,716,329 B2 7/2020 Matsumoto et al.
10,757,975 B2 9/2020 Batista et al.
10,813,174 B2 10/2020 Schneider et al.
10,863,773 B2 12/2020 Suzuki
10,881,143 B2 1/2021 Suzuki et al.
11,039,642 B2 6/2021 Zuber et al.
11,147,316 B2 10/2021 Farine et al.
11,445,576 B2 9/2022 Zinovik et al.
11,627,759 B2 4/2023 Han et al.
2004/0261802 A1 12/2004 Griffin et al.
2005/0045198 A1 3/2005 Larson et al.
2005/0172976 A1 8/2005 Newman et al.
2006/0030214 A1 2/2006 Katou et al.
2007/0045288 A1 3/2007 Nelson
2008/0001052 A1 1/2008 Kalous et al.
2009/0283103 A1 11/2009 Nielsen et al.
2010/0001538 A1 1/2010 Kim et al.
2010/0024834 A1 2/2010 Oglesby et al.
2010/0242977 A1 9/2010 Tarora et al.
2010/0307518 A1 12/2010 Wang
2011/0126848 A1 6/2011 Zuber et al.
2011/0155151 A1 6/2011 Newman et al.
2011/0209717 A1 9/2011 Han
2011/0226236 A1 9/2011 Buchberger
2011/0265806 A1 11/2011 Alarcon et al.
2011/0290248 A1 12/2011 Schennum
2011/0290269 A1 12/2011 Shimizu
2012/0006343 A1 1/2012 Renaud et al.
2012/0048266 A1 3/2012 Alelov
2012/0227753 A1 9/2012 Newton
2012/0247494 A1 10/2012 Oglesby et al.
2012/0325232 A1 12/2012 Yokogawa et al.
2013/0014772 A1 1/2013 Liu
2013/0037041 A1 2/2013 Worm et al.
2013/0074857 A1 3/2013 Buchberger
2013/0213419 A1 8/2013 Tucker et al.
2013/0233329 A1 9/2013 Sebastian et al.
2013/0284192 A1 10/2013 Peleg et al.
2013/0298905 A1 11/2013 Levin et al.
2013/0319439 A1 12/2013 Gorelick et al.
2013/0319999 A1 12/2013 Plojoux et al.
2013/0340775 A1 12/2013 Juster et al.
2014/0007863 A1 1/2014 Chen
2014/0014125 A1 1/2014 Fernando et al.

(56) References Cited

U.S. PATENT DOCUMENTS

2014/0020698 A1 1/2014 Fiebelkorn
2014/0096782 A1 4/2014 Ampolini et al.
2014/0101960 A1 4/2014 Kida et al.
2014/0116455 A1 5/2014 Youn
2014/0246035 A1 9/2014 Minskoff et al.
2014/0251356 A1 9/2014 Xiang
2014/0299137 A1 10/2014 Kieckbusch et al.
2014/0301721 A1 10/2014 Ruscio et al.
2014/0305448 A1 10/2014 Zuber et al.
2014/0318559 A1 10/2014 Thorens et al.
2014/0334804 A1 11/2014 Choi
2014/0338686 A1 11/2014 Plojoux et al.
2014/0345633 A1 11/2014 Talon et al.
2014/0345634 A1 11/2014 Zuber et al.
2014/0363145 A1 12/2014 Plojoux et al.
2015/0007838 A1 1/2015 Fernando et al.
2015/0013696 A1 1/2015 Plojoux et al.
2015/0020825 A1* 1/2015 Galloway ............... G08B 6/00 340/407.1
2015/0020832 A1 1/2015 Greim et al.
2015/0024355 A1 1/2015 Ghofrani et al.
2015/0027474 A1 1/2015 Zuber et al.
2015/0059996 A1 3/2015 Zitturi et al.
2015/0100441 A1 4/2015 Alarcon et al.
2015/0136124 A1 5/2015 Aronie et al.
2015/0136154 A1 5/2015 Mitrev et al.
2015/0189910 A1 7/2015 Sebastian et al.
2015/0201676 A1 7/2015 Shin
2015/0208725 A1 7/2015 Tsai
2015/0208730 A1 7/2015 Li et al.
2015/0245654 A1 9/2015 Memari et al.
2015/0245666 A1 9/2015 Memari et al.
2015/0257445 A1 9/2015 Henry, Jr. et al.
2015/0272211 A1 10/2015 Chung
2015/0296878 A1 10/2015 Mucalo et al.
2015/0359259 A1 12/2015 Conner et al.
2016/0031032 A1 2/2016 Bienvenu et al.
2016/0150824 A1 6/2016 Memari et al.
2016/0205998 A1 7/2016 Matsumoto et al.
2016/0213066 A1 7/2016 Zitzke et al.
2016/0235121 A1 8/2016 Rogan et al.
2016/0270437 A1 9/2016 Nappi
2016/0286861 A1 10/2016 Liu
2016/0302488 A1 10/2016 Fernando et al.
2016/0331032 A1 11/2016 Malgat et al.
2016/0345629 A1 12/2016 Mironov
2016/0366933 A1 12/2016 Liu
2016/0366937 A1 12/2016 Liu
2016/0366946 A1 12/2016 Murison et al.
2016/0374402 A1 12/2016 Fernando et al.
2017/0006916 A1 1/2017 Liu
2017/0006919 A1 1/2017 Liu
2017/0027229 A1 2/2017 Cameron
2017/0027234 A1 2/2017 Farine et al.
2017/0042243 A1 2/2017 Plojoux et al.
2017/0042251 A1 2/2017 Yamada et al.
2017/0042252 A1 2/2017 Takeuchi et al.
2017/0055580 A1 3/2017 Blandino et al.
2017/0065002 A1 3/2017 Fernando et al.
2017/0071251 A1 3/2017 Goch
2017/0071259 A1 3/2017 Yamada et al.
2017/0095006 A1 4/2017 Egoyants et al.
2017/0150757 A1 6/2017 Worm et al.
2017/0164659 A1 6/2017 Schneider et al.
2017/0172214 A1 6/2017 Li et al.
2017/0172215 A1 6/2017 Li et al.
2017/0188634 A1 7/2017 Plojoux et al.
2017/0238596 A1 8/2017 Matsumoto et al.
2017/0238605 A1 8/2017 Matsumoto
2017/0295844 A1 10/2017 Thevenaz et al.
2018/0153216 A1 6/2018 Wong et al.
2018/0177234 A1 6/2018 Lee
2018/0206556 A1 7/2018 Thorens et al.
2018/0235283 A1 8/2018 Zuber et al.
2018/0280653 A1 10/2018 Buchberger
2019/0014826 A1 1/2019 Thorens et al.
2019/0075849 A1 3/2019 Hawes
2019/0116633 A1 4/2019 Qiu
2019/0297937 A1 10/2019 Guyard et al.
2019/0320719 A1 10/2019 Liu et al.
2019/0364975 A1 12/2019 Fernando et al.
2020/0006950 A1 1/2020 Holzherr
2020/0008475 A1 1/2020 Lai et al.
2020/0008480 A1 1/2020 Batista
2020/0120983 A1 4/2020 Chen
2020/0154765 A1 5/2020 Lee et al.
2020/0232766 A1 7/2020 Flick
2020/0305508 A1 10/2020 Talon
2020/0352224 A1 11/2020 Plojoux et al.
2020/0352231 A1 11/2020 Han et al.
2020/0359681 A1 11/2020 Han et al.
2020/0359682 A1 11/2020 Han et al.
2020/0413495 A1 12/2020 Schneider et al.
2021/0000182 A1 1/2021 Ruscio et al.
2021/0077752 A1 3/2021 Buchberger
2021/0120875 A1 4/2021 Mironov
2022/0087309 A1 3/2022 Han et al.
2022/0117293 A1 4/2022 Zuber et al.
2022/0125099 A1 4/2022 Mitrev et al.
2023/0210166 A1 7/2023 Han et al.
2024/0251876 A1 8/2024 Kuczaj

FOREIGN PATENT DOCUMENTS

CH 310239 A 12/1955
CN 2146758 Y 11/1993
CN 1102964 A 5/1995
CN 1122213 A 5/1996
CN 1190335 A 8/1998
CN 1209731 A 3/1999
CN 1205388 C 6/2005
CN 1212785 C 8/2005
CN 2857109 Y 1/2007
CN 1973706 A 6/2007
CN 101043827 A 9/2007
CN 101444335 A 6/2009
CN 201467999 U 5/2010
CN 201491717 U 6/2010
CN 101896082 A 11/2010
CN 101940369 A 1/2011
CN 102006790 A 4/2011
CN 102109393 A 6/2011
CN 102216526 A 10/2011
CN 102326869 A 1/2012
CN 102438470 A 5/2012
CN 102481021 A 5/2012
CN 202407082 U 9/2012
CN 102762118 A 10/2012
CN 102821632 A 12/2012
CN 102934843 A 2/2013
CN 202774134 U 3/2013
CN 103096741 A 5/2013
CN 103281920 A 9/2013
CN 103338665 A 10/2013
CN 103501644 A 1/2014
CN 103622162 A 3/2014
CN 203457802 U 3/2014
CN 103717802 A 4/2014
CN 103717803 A 4/2014
CN 203563687 U 4/2014
CN 203575658 U 5/2014
CN 103859606 A 6/2014
CN 203633505 U 6/2014
CN 203646503 U 6/2014
CN 103929988 A 7/2014
CN 103929989 A 7/2014
CN 203689071 U 7/2014
CN 203692545 U 7/2014
CN 103974638 A 8/2014
CN 103974640 A 8/2014
CN 103987286 A 8/2014
CN 103997921 A 8/2014
CN 103997922 A 8/2014
CN 104010531 A 8/2014

(56) References Cited

FOREIGN PATENT DOCUMENTS

| | | | |
|---|---|---|---|
| CN | 203789137 | U | 8/2014 |
| CN | 104023568 | A | 9/2014 |
| CN | 104023574 | A | 9/2014 |
| CN | 104039183 | A | 9/2014 |
| CN | 203814592 | U | 9/2014 |
| CN | 104095295 | A | 10/2014 |
| CN | 104106842 | A | 10/2014 |
| CN | 104135882 | A | 11/2014 |
| CN | 203943078 | A | 11/2014 |
| CN | 104203015 | A | 12/2014 |
| CN | 204070570 | U | 1/2015 |
| CN | 204146338 | U | 2/2015 |
| CN | 102811634 | B | 3/2015 |
| CN | 104382237 | A | 3/2015 |
| CN | 104470386 | A | 3/2015 |
| CN | 104470387 | A | 3/2015 |
| CN | 104489933 | A | 4/2015 |
| CN | 104544559 | A | 4/2015 |
| CN | 204317494 | U | 5/2015 |
| CN | 204317504 | U | 5/2015 |
| CN | 104754964 | A | 7/2015 |
| CN | 104770878 | A | 7/2015 |
| CN | 104799438 | A | 7/2015 |
| CN | 104812260 | A | 7/2015 |
| CN | 204444239 | U | 7/2015 |
| CN | 104839886 | A | 8/2015 |
| CN | 104869854 | A | 8/2015 |
| CN | 104886775 | A | 9/2015 |
| CN | 104902767 | A | 9/2015 |
| CN | 204763414 | U | 11/2015 |
| CN | 105163610 | A | 12/2015 |
| CN | 105208882 | A | 12/2015 |
| CN | 105208884 | A | 12/2015 |
| CN | 105341993 | A | 2/2016 |
| CN | 105357994 | A | 2/2016 |
| CN | 205018293 | U | 2/2016 |
| CN | 105361250 | A | 3/2016 |
| CN | 105453598 | A | 3/2016 |
| CN | 205072064 | U | 3/2016 |
| CN | 205180371 | U | 4/2016 |
| CN | 105592736 | A | 5/2016 |
| CN | 205197003 | U | 5/2016 |
| CN | 105722416 | A | 6/2016 |
| CN | 205337598 | U | 6/2016 |
| CN | 105747281 | A | 7/2016 |
| CN | 105789506 | A | 7/2016 |
| CN | 105831812 | A | 8/2016 |
| CN | 105848503 | A | 8/2016 |
| CN | 105852223 | A | 8/2016 |
| CN | 105876869 | A | 8/2016 |
| CN | 205456048 | U | 8/2016 |
| CN | 205512358 | U | 8/2016 |
| CN | 105939625 | A | 9/2016 |
| CN | 205597118 | U | 9/2016 |
| CN | 106037014 | A | 10/2016 |
| CN | 205648910 | U | 10/2016 |
| CN | 205658366 | U | 10/2016 |
| CN | 104135881 | B | 11/2016 |
| CN | 106072762 | A | 11/2016 |
| CN | 106102492 | A | 11/2016 |
| CN | 106132217 | A | 11/2016 |
| CN | 106136332 | A | 11/2016 |
| CN | 106163307 | A | 11/2016 |
| CN | 205728067 | U | 11/2016 |
| CN | 106174699 | A | 12/2016 |
| CN | 106231934 | A | 12/2016 |
| CN | 106255430 | A | 12/2016 |
| CN | 205831062 | U | 12/2016 |
| CN | 205884659 | U | 1/2017 |
| CN | 106376975 | A | 2/2017 |
| CN | 106413439 | A | 2/2017 |
| CN | 106413444 | A | 2/2017 |
| CN | 106455708 | A | 2/2017 |
| CN | 106455714 | A | 2/2017 |
| CN | 106455716 | A | 2/2017 |
| CN | 106473233 | A | 3/2017 |
| CN | 106535680 | A | 3/2017 |
| CN | 206025202 | U | 3/2017 |
| CN | 206097720 | U | 4/2017 |
| CN | 206197012 | U | 5/2017 |
| CN | 106858726 | A | 6/2017 |
| CN | 106901404 | A | 6/2017 |
| CN | 206312988 | U | 7/2017 |
| CN | 107080292 | A | 8/2017 |
| CN | 206443202 | U | 8/2017 |
| CN | 206472849 | U | 9/2017 |
| CN | 207220157 | U | 4/2018 |
| CN | 105342011 | B | 6/2018 |
| CN | 207836767 | U | 9/2018 |
| CN | 208192123 | U | 12/2018 |
| CN | 208192126 | U | 12/2018 |
| CN | 110494053 | B | 5/2022 |
| DE | 3302518 | A1 | 7/1984 |
| DE | 20-2014-004361 | U1 | 10/2015 |
| EA | 012169 | B1 | 8/2009 |
| EA | 026076 | B1 | 2/2017 |
| EP | 1119267 | B1 | 7/2004 |
| EP | 1 964 482 | A1 | 2/2007 |
| EP | 2 110 033 | A1 | 10/2009 |
| EP | 2113178 | A1 | 11/2009 |
| EP | 2 201 850 | A1 | 6/2010 |
| EP | 2253233 | A1 | 11/2010 |
| EP | 2316286 | A1 | 5/2011 |
| EP | 2 022 349 | B1 | 7/2014 |
| EP | 2 875 740 | A2 | 5/2015 |
| EP | 2 531 053 | B1 | 9/2015 |
| EP | 2921065 | A1 | 9/2015 |
| EP | 2 740 370 | B1 | 4/2016 |
| EP | 3 098 738 | A1 | 11/2016 |
| EP | 2 432 339 | B1 | 3/2017 |
| EP | 3 179 828 | A1 | 6/2017 |
| EP | 3 571 941 | A1 | 11/2019 |
| EP | 3 632 239 | A1 | 4/2020 |
| EP | 3632237 | A1 | 4/2020 |
| EP | 3 275 319 | B1 | 8/2020 |
| GB | 2542018 | A | 3/2017 |
| GB | 2550540 | A | 11/2017 |
| JP | 2-190178 | A | 7/1990 |
| JP | 3-232481 | A | 10/1991 |
| JP | 6-209756 | A | 8/1994 |
| JP | 7-184627 | A | 7/1995 |
| JP | 9-47271 | A | 2/1997 |
| JP | 11-40122 | A | 2/1999 |
| JP | 11-164679 | A | 6/1999 |
| JP | 3645921 | B2 | 5/2005 |
| JP | 2006-92831 | A | 4/2006 |
| JP | 2006-320286 | A | 11/2006 |
| JP | 4278306 | B2 | 6/2009 |
| JP | 2010-178730 | A | 8/2010 |
| JP | 2010-526553 | A | 8/2010 |
| JP | 2011-87569 | A | 5/2011 |
| JP | 2011-518567 | A | 6/2011 |
| JP | 4739433 | B2 | 8/2011 |
| JP | 2012-506263 | A | 3/2012 |
| JP | 2012-527222 | A | 11/2012 |
| JP | 2013-519384 | A | 5/2013 |
| JP | 2014-500017 | A | 1/2014 |
| JP | 2014-79229 | A | 5/2014 |
| JP | 2014-511175 | A | 5/2014 |
| JP | 2014-521419 | A | 8/2014 |
| JP | 2014-525237 | A | 9/2014 |
| JP | 2014-533513 | A | 12/2014 |
| JP | 2014-534813 | A | 12/2014 |
| JP | 2015-503335 | A | 2/2015 |
| JP | 2015-503916 | A | 2/2015 |
| JP | 2015-504669 | A | 2/2015 |
| JP | 2015-506170 | A | 3/2015 |
| JP | 2015-507477 | A | 3/2015 |
| JP | 2015-508996 | A | 3/2015 |
| JP | 2015-524261 | A | 8/2015 |
| JP | 2015-156806 | A | 9/2015 |
| JP | 2015-180214 | A | 10/2015 |
| JP | 2015-529458 | A | 10/2015 |
| JP | 2015-204833 | A | 11/2015 |

(56) References Cited

FOREIGN PATENT DOCUMENTS

| | | | |
|---|---|---|---|
| JP | 2016-528910 | A | 9/2016 |
| JP | 3207506 | U | 11/2016 |
| JP | 2016-538848 | A | 12/2016 |
| JP | 2017-501682 | A | 1/2017 |
| JP | 2017-46700 | A | 3/2017 |
| JP | 2017-51189 | A | 3/2017 |
| JP | 2017-70297 | A | 4/2017 |
| JP | 2017-514463 | A | 6/2017 |
| JP | 2020-501610 | A | 1/2020 |
| JP | 2021-153586 | A | 10/2021 |
| KR | 1999-007914 | A | 1/1999 |
| KR | 10-0304044 | B1 | 11/2001 |
| KR | 10-0636287 | B1 | 10/2006 |
| KR | 10-0806461 | B1 | 2/2008 |
| KR | 20-2009-0008911 | U | 9/2009 |
| KR | 10-0965099 | B1 | 6/2010 |
| KR | 10-1001077 | B1 | 12/2010 |
| KR | 10-2011-0096548 | A | 8/2011 |
| KR | 20-2011-0009632 | U | 10/2011 |
| KR | 10-1098112 | B1 | 12/2011 |
| KR | 10-2012-0027029 | A | 3/2012 |
| KR | 10-2012-0080285 | A | 7/2012 |
| KR | 10-2012-0101637 | A | 9/2012 |
| KR | 10-1184499 | B1 | 9/2012 |
| KR | 10-2012-0109634 | A | 10/2012 |
| KR | 10-2012-0114333 | A | 10/2012 |
| KR | 10-2012-0121314 | A | 11/2012 |
| KR | 200464889 | Y1 | 2/2013 |
| KR | 10-2013-0027909 | A | 3/2013 |
| KR | 20-0466757 | Y1 | 5/2013 |
| KR | 10-2013-0081238 | A | 7/2013 |
| KR | 20-0469513 | Y1 | 10/2013 |
| KR | 10-2013-0139296 | A | 12/2013 |
| KR | 10-2014-0015774 | A | 2/2014 |
| KR | 10-1383577 | B1 | 4/2014 |
| KR | 10-2014-0068203 | A | 6/2014 |
| KR | 10-2014-0092312 | A | 7/2014 |
| KR | 10-2014-0114554 | A | 9/2014 |
| KR | 10-2014-0116055 | A | 10/2014 |
| KR | 10-2014-0118983 | A | 10/2014 |
| KR | 10-2014-0119072 | A | 10/2014 |
| KR | 10-2014-0135774 | A | 11/2014 |
| KR | 20-2014-0006242 | U | 12/2014 |
| KR | 10-2015-0030409 | A | 3/2015 |
| KR | 10-2015-0033617 | A | 4/2015 |
| KR | 10-2015-0058569 | A | 5/2015 |
| KR | 10-1516304 | B1 | 5/2015 |
| KR | 10-1523088 | B1 | 5/2015 |
| KR | 10-2015-0099704 | A | 9/2015 |
| KR | 10-2015-0099771 | A | 9/2015 |
| KR | 10-2015-0105268 | A | 9/2015 |
| KR | 10-2016-0009678 | A | 1/2016 |
| KR | 10-2016-0012110 | A | 2/2016 |
| KR | 10-2016-0012329 | A | 2/2016 |
| KR | 10-2016-0015144 | A | 2/2016 |
| KR | 10-2016-0040643 | A | 4/2016 |
| KR | 10-1609715 | B1 | 4/2016 |
| KR | 10-2016-0052607 | A | 5/2016 |
| KR | 10-2016-0060006 | A | 5/2016 |
| KR | 10-1619032 | B1 | 5/2016 |
| KR | 20-2016-0001476 | U | 5/2016 |
| KR | 10-2016-0088163 | A | 7/2016 |
| KR | 10-2016-0094938 | A | 8/2016 |
| KR | 10-2016-0096744 | A | 8/2016 |
| KR | 10-2016-0108855 | A | 9/2016 |
| KR | 10-2016-0110670 | A | 9/2016 |
| KR | 10-1656061 | | 9/2016 |
| KR | 10-2016-0114743 | A | 10/2016 |
| KR | 10-2016-0124091 | A | 10/2016 |
| KR | 10-1667124 | B1 | 10/2016 |
| KR | 10-1668175 | B1 | 10/2016 |
| KR | 10-2016-0129024 | A | 11/2016 |
| KR | 10-2016-0131035 | A | 11/2016 |
| KR | 10-2016-0133665 | A | 11/2016 |
| KR | 10-2016-0137627 | A | 11/2016 |
| KR | 10-1679489 | B1 | 11/2016 |
| KR | 10-2016-0140608 | A | 12/2016 |
| KR | 10-2016-0142896 | A | 12/2016 |
| KR | 10-2016-0147253 | A | 12/2016 |
| KR | 10-1690389 | B1 | 12/2016 |
| KR | 10-2017-0006282 | A | 1/2017 |
| KR | 10-2017-0007262 | A | 1/2017 |
| KR | 10-2017-0044158 | A | 4/2017 |
| KR | 10-2017-0071486 | A | 6/2017 |
| KR | 10-2017-0074898 | A | 6/2017 |
| KR | 10-1740160 | | 6/2017 |
| KR | 10-2017-0119664 | A | 10/2017 |
| KR | 10-2018-0070457 | A | 6/2018 |
| RU | 2302806 | C2 | 7/2007 |
| RU | 2425608 | C2 | 8/2011 |
| RU | 2 531 890 | C2 | 10/2014 |
| RU | 2564600 | C1 | 10/2015 |
| RU | 2014 125 232 | A | 12/2015 |
| RU | 2581999 | C2 | 4/2016 |
| RU | 2589437 | C2 | 7/2016 |
| RU | 2594557 | C2 | 8/2016 |
| RU | 2595593 | C2 | 8/2016 |
| RU | 2 602 053 | C2 | 11/2016 |
| RU | 2 602 962 | C2 | 11/2016 |
| RU | 2 603 559 | C2 | 11/2016 |
| RU | 2 604 012 | C2 | 12/2016 |
| UA | 104628 | C2 | 2/2014 |
| UA | 112169 | C2 | 8/2016 |
| WO | 94/06314 | A1 | 3/1994 |
| WO | 95/33246 | A1 | 12/1995 |
| WO | 98/23171 | A1 | 6/1998 |
| WO | 00/27232 | A1 | 5/2000 |
| WO | 2010/045670 | A1 | 4/2010 |
| WO | 2010/133342 | A1 | 11/2010 |
| WO | 2011/028372 | A1 | 3/2011 |
| WO | 2011/050964 | A1 | 5/2011 |
| WO | 2011/095781 | A1 | 8/2011 |
| WO | 2012/072264 | A1 | 6/2012 |
| WO | 2012/123702 | A1 | 9/2012 |
| WO | 2012/126721 | A1 | 9/2012 |
| WO | 2013/021863 | A1 | 2/2013 |
| WO | 2013/034458 | A1 | 3/2013 |
| WO | 2013/060743 | A2 | 5/2013 |
| WO | 2013/076098 | A2 | 5/2013 |
| WO | 2013/083635 | A1 | 6/2013 |
| WO | 2013/093695 | A1 | 6/2013 |
| WO | 2013/098395 | A1 | 7/2013 |
| WO | 2013/098396 | A2 | 7/2013 |
| WO | 2013/098397 | A2 | 7/2013 |
| WO | 2013/098398 | A3 | 7/2013 |
| WO | 2013/098409 | A1 | 7/2013 |
| WO | 2013/102609 | A2 | 7/2013 |
| WO | 2013/102612 | A2 | 7/2013 |
| WO | 2013/120565 | A3 | 8/2013 |
| WO | 2013/126777 | A2 | 8/2013 |
| WO | 2013/137084 | A1 | 9/2013 |
| WO | 2013/171217 | A1 | 11/2013 |
| WO | 2013/190036 | A1 | 12/2013 |
| WO | 2014/029880 | A2 | 2/2014 |
| WO | 2014/075369 | A1 | 5/2014 |
| WO | 2014/102092 | A1 | 7/2014 |
| WO | 2015/046386 | A1 | 4/2015 |
| WO | 2015/088744 | A1 | 6/2015 |
| WO | 2015/092071 | A1 | 6/2015 |
| WO | 2015/108078 | A1 | 7/2015 |
| WO | 2015/117704 | A1 | 8/2015 |
| WO | 2015/128665 | A1 | 9/2015 |
| WO | 2015/155289 | A1 | 10/2015 |
| WO | 2015/165813 | A1 | 11/2015 |
| WO | 2015/174657 | A1 | 11/2015 |
| WO | 2015/177044 | A1 | 11/2015 |
| WO | 2015/197627 | A1 | 12/2015 |
| WO | 2016/012811 | A1 | 1/2016 |
| WO | 2016/055653 | A1 | 4/2016 |
| WO | 2016/059073 | A1 | 4/2016 |
| WO | 2016/075028 | A1 | 5/2016 |
| WO | 2016/076147 | A1 | 5/2016 |
| WO | 2016/107766 | A1 | 7/2016 |
| WO | 2016/123779 | A1 | 8/2016 |

(56) References Cited

FOREIGN PATENT DOCUMENTS

| | | | |
|---|---|---|---|
| WO | 2016/124550 | A1 | 8/2016 |
| WO | 2016/124552 | A1 | 8/2016 |
| WO | 2016/150019 | A1 | 9/2016 |
| WO | 2016/156103 | A1 | 10/2016 |
| WO | 2016/156121 | A1 | 10/2016 |
| WO | 2016/156219 | A1 | 10/2016 |
| WO | 2016/159013 | A1 | 10/2016 |
| WO | 2016/166064 | A1 | 10/2016 |
| WO | 2016/178377 | A1 | 11/2016 |
| WO | 2016/187803 | A1 | 12/2016 |
| WO | 2017/029088 | A1 | 2/2017 |
| WO | 2017/029089 | A1 | 2/2017 |
| WO | 2017/037457 | A1 | 3/2017 |
| WO | 2017/042297 | A1 | 3/2017 |
| WO | 2017/075759 | A1 | 5/2017 |
| WO | 2017/075975 | A1 | 5/2017 |
| WO | 2017/139963 | A1 | 8/2017 |
| WO | 2018050449 | A1 | 3/2018 |
| WO | 2018/189195 | A1 | 10/2018 |
| WO | 2019/014991 | A1 | 1/2019 |
| WO | 2019/020826 | A1 | 1/2019 |
| WO | 2019/030172 | A1 | 2/2019 |
| WO | 2019/095268 | A1 | 5/2019 |
| WO | 2019/121808 | A1 | 6/2019 |

OTHER PUBLICATIONS

Notice of Reasons for Refusal issued Oct. 22, 2024 in Japanese Application No. 2023-021861.
Communication dated Mar. 30, 2025 from the Intellectual Property Office of the Philippines in Application No. Invention 1/2022/551913.
Communication dated May 27, 2025 from the Federal Service for Intellectual Property Office of Russia in Application No. 2021127058/03.
Office Action issued Feb. 11, 2020 in Korean Application No. 10-2018-0010834.
Office Action issued Jan. 16, 2020 in Korean Application No. 10-2017-0084387.
Office Action issued Jan. 3, 2020 in Korean Application No. 10-2018-0012456.
Office Action issued Nov. 14, 2019 in Korean Application No. 10-2017-0147605.
Extended European search report issued Nov. 4, 2020 by the European Patent Office in Application No. 17880867.1.
Decision on Grant issued Nov. 26, 2020 by the Russian Federal Service For Intellectual Property Patent Application No. 2020124607.
Office Action issued Dec. 11, 2019 in Korean Application No. 10-2018-0010836.
Office Action issued Feb. 11, 2020 in Korean Application No. 10-2018-0010835.
Office Action issued Jan. 16, 2020 in Korean Application No. 10-2017-0084388.
Office Action issued Jan. 3, 2020 in Korean Application No. 10-2018-0018693.
Extended European Search Report issued Jan. 29, 2021 in European Application No. 18784464.2.
Extended European Search Report issued Mar. 25, 2021 in European Application No. 18784370.1.
Office Action issued Feb. 24, 2021 in Japanese Application No. 2019-555204.
Office Action issued Jan. 26, 2021 in Japanese Application No. 2020-501521.
Extended European Search Report issued Jan. 15, 2021 in European Application No. 20188949.0.
International Search Report issued Nov. 6, 2018 in International Application No. PCT/KR2018/004129.
International Search Report issued Sep. 6, 2018 in International Application No. PCT/KR2018/004176.
Office Action issued Dec. 11, 2019 in Korean Application No. 10-2018-0010841.
Office Action issued Feb. 13, 2020 in Korean Application No. 10-2018-0010837.
Office Action issued Jan. 3, 2020 in Korean Application No. 10-2017-0084386.
International Search Report issued Jul. 24, 2018 in International Application No. PCT/KR2018/003691.
International Search Report issued Nov. 6, 2018 in International Application No. PCT/KR2018/004130.
International Search Report issued Sep. 6, 2018 in International Application No. PCT/KR2018/004179.
Office Action issued Jul. 3, 2019 in Korean Application No. 10-2019-0017391.
Office Action issued Dec. 19, 2019 in Korean Application No. 10-2018-0090910.
Office Action issued Feb. 18, 2020 in Russian Application No. 2019121813.
Office Action issued Jan. 3, 2020 in Korean Application No. 10-2017-0084389.
Office Action issued Jan. 8, 2020 in Korean Application No. 10-2017-0128293.
Office Action dated Aug. 7, 2019 for Korean Patent Application No. 10-2018-0067035, and its English translation provided by Applicants foreign counsel.
Office Action issued Oct. 29, 2020 by the Korean Patent Office in Application No. 10-2018-0010837.
Office Action issued Nov. 26, 2020 by Russian Federal Service For Intellectual Property Office Patent Application No. 2020124609.
Office Action issued Jan. 8, 2020 in Korean Application No. 10-2017-0119664.
Office Action dated Jun. 27, 2019 for Korean Patent Application No. 10-2018-0063759, and its English translation provided by Applicants foreign counsel.
Office Action issued Nov. 14, 2019 in Korean Application No. 10-2017-0084385.
Office Action dated Jul. 2, 2019 for Korean Patent Application No. 10-2019-0018815, and its English translation provided by Applicants foreign counsel.
Extended European Search Report issued Mar. 15, 2021 in European Application No. 18785061.5.
Extended European Search Report issued Mar. 25, 2021 in European Application No. 18784841.1.
Office Action issued Feb. 4, 2021 in Russian Application No. 2020124609.
Office Action issued Mar. 2, 2021 in Japanese Application No. 2019-555170.
Communication dated Jul. 22, 2021 by the Korean Patent Office in Korean Application No. 10-2021-0051359.
Written Opinion of the International Searching Authority for PCT/KR2017/012486 mailed May 29, 2018 and its English translation by Google Translate (now published as WO 2018/110834).
Office Action issued Nov. 4, 2020 by the Japanese Patent Office in Application No. 2019-554453.
Decision on Grant issued Oct. 26, 2020 by Russian Federal Service For Intellectual Property in Application No. 2020124610.
Extended European Search Report issued Jan. 14, 2021 in European Application No. 18783776.0.
Extended European Search Report issued Mar. 19, 2021 in European Application No. 18784164.8.
Office Action issued Feb. 24, 2021 in Japanese Application No. 2019-555168.
Office Action issued Apr. 9, 2021 in Korean Application No. 10-2020-0116256.
Extended European Search Report issued Apr. 1, 2021 in European Application No. 18805933.1.
Extended European Search Report issued Jun. 16, 2021 in European Application No. 18853434.1.
International Search Report dated Dec. 4, 2018 from the International Searching Authority in International Application No. PCT/KR2018/006747.

(56) References Cited

OTHER PUBLICATIONS

International Search Report dated Nov. 6, 2018 from the International Searching Authority in International Application No. PCT/KR2018/004129.
Office Action issued Jun. 29, 2021 in Chinese Application No. 201880022072.2.
Communication dated Feb. 28, 2022 from the Chinese Patent Office in Chinese Application No. 201880050526.7.
International Search Report issued May 29, 2018 in International Application No. PCT/KR2017/012486.
International Search Report issued Nov. 6, 2018 in International Application No. PCT/KR2018/004178.
International Search Report issued Sep. 7, 2018 in International Application No. PCT/KR2018/004171.
Extended European Search Report issued Dec. 10, 2020 in European Application No. 20188932.6.
Extended European Search Report issued Dec. 18, 2020 in European Application No. 20188926.8.
Office Action issued Dec. 1, 2020 in Japanese Application No. 2020-501188.
Office Action issued Jan. 12, 2021 in Japanese Application No. 2019-555169.
Office Action issued Jan. 22, 2021 in Russian Application No. 2020124657.
Office Action issued Sep. 24, 2020 in Korean Application No. 10-2018-0012456.
Notice of Reasons for Refusal dated Jun. 28, 2022 from the Japanese Patent Office in Japanese Application No. 2021-075028.
Partial supplementary European search report issued Aug. 3, 2020 in Application No. 17880867.1.
Office Action issued Nov. 4, 2020 by the Japanese Patent Office in Application No. 2020-128346.
Office Action issued Jun. 29, 2020 by the Korean Patent Office in Application No. 10-2018-0010836.
Extended European Search Report issued Jan. 25, 2021 in European Application No. 18785166.2.
Extended European Search Report issued Mar. 24, 2021 in European Application No. 18784268.7.
Office Action dated Sep. 20, 2022 issued by the Japanese Patent Office in Japanese Application No. 2021-174035.
Office Action issued Oct. 24, 2022 in Ukrainian Application No. a 2020 04868.
Office Action issued Oct. 27, 2022 in Ukrainian Application No. a 2020 04869.
Office Action dated Jan. 10, 2023, issued in Chinese Application No. 202010760990.4.
Communication dated Dec. 1, 2021 from the Chinese Patent Office in Chinese Application No. 201880046367.3.
Communication dated Mar. 14, 2022 from the Chinese Patent Office in Chinese Application No. 201880024059.0.
Office Action issued Nov. 22, 2022 in Chinese Application No. 202010762996.5.
Office Action dated Jan. 3, 2023, issued in Chinese Application No. 202010760979.8.
Communication dated Nov. 25, 2021 from the Chinese Patent Office in Chinese Application No. 201880047174.X.
International Search Report issued Nov. 14, 2018 in International Application No. PCT/KR2018/004118.
International Search Report issued Oct. 29, 2018 in International Application No. PCT/KR2018/004181.
International Search Report issued Sep. 7, 2018 in International Application No. PCT/KR2018/004172.
Office Action issued Nov. 2, 2022 in Chinese Application No. 201880050526.7.
Office Action dated Jan. 28, 2023, issued in Chinese Application No. 202010763214.X.
Office Action issued Feb. 24, 2021 in Japanese Application No. 2019-555203.
Office Action issued Jan. 19, 2021 in Indonesian Application No. P00201906007.
Office Action issued Feb. 9, 2021 in Japanese Application No. 2019-555184.
Office Action issued Mar. 2, 2021 in Japanese Application No. 2019-555182.
Office Action issued Apr. 4, 2019 in Korean Application No. 10-2019-0019194.
International Search Report dated Nov. 26, 2018 from the International Searching Authority in International Application No. PCT/KR2018/009094.
Office Action issued Jun. 10, 2021 in Russian Application No. 2020124657.
Office Action issued Apr. 25, 2019 in Korean Application No. 10-2019-0033784.
Office Action issued May 5, 2021 in Canadian Application No. 3,047,236.
Extended European Search Report issued Jun. 14, 2021 in European Application No. 18842951.8.
International Search Report dated Feb. 28, 2019 from the International Searching Authority in International Application No. PCT/KR2018/009100.
Office Action issued Apr. 5, 2021 in Korean Application No. 10-2019-0027638.
Extended European Search Report issued Dec. 16, 2020 in European Application No. 20188985.4.
Office Action issued Dec. 28, 2020 in Russian Application No. 2020124652.
Office Action issued Jan. 19, 2021 in Japanese Application No. 2019-553569.
Office Action issued Jan. 5, 2021 in Japanese Application No. 2019-558557.
Communication dated Jun. 9, 2022 from the Philippine Patent Office in Philippine Application No. 1-2019-501361.
Office Action issued Mar. 30, 2021 in Japanese Application No. 2020-501377.
Office Action issued Apr. 4, 2019 in Korean Application No. 10-2019-0019195.
International Search Report dated Aug. 29, 2018 from the International Searching Authority in International Application No. PCT/KR2018/005945.
International Search Report dated Nov. 30, 2018, from the International Searching Authority in International Application No. in PCT/KR2018/006702.
Office Action issued Jun. 10, 2021 in Russian Application No. 2020124658.
Extended European Search Report issued Jul. 1, 2021 in European Application No. 18854661.8.
Extended European Search Report issued Dec. 18, 2020 in European Application No. 18775504.6.
Extended European Search Report issued Nov. 19, 2020 in European Application No. 20188792.4.
Office Action issued Dec. 30, 2020 in Russian Application No. 2020124651.
Office Action issued Jan. 19, 2021 in Japanese Application No. 2020-501514.
Office Action issued May 28, 2020 in Korean Application No. 10-2017-0147605.
Communication dated May 30, 2022 from the Canadian Patent Office in Canadian Application No. 3080145.
Extended European Search Report issued Dec. 11, 2020 in European Application No. 20188967.2.
Extended European Search Report issued Jan. 14, 2021 in European Application No. 18784738.9.
Office Action issued Dec. 11, 2020 in Russian Application No. 2020124653.
Office Action issued Jan. 12, 2021 in Japanese Application No. 2019-555201.
Office Action issued Jan. 22, 2021 in Russian Application No. 2020124658.
Office Action dated Aug. 12, 2022 issued by the Chinese Patent Office in Chinese Application No. 201880024059.0.
Office Action issued Dec. 30, 2022 in Chinese Application No. 202010756239.7.

(56) References Cited

OTHER PUBLICATIONS

Office Action issued Dec. 13, 2022 in Japanese Application No. 2021-165298.
Office Action dated Jan. 10, 2023, issued in Japanese Application No. 2021-177649.
Communication dated Jul. 27, 2021 by the Chinese Patent Office in Chinese Application No. 201780084891.5.
Communication dated Aug. 16, 2021 by the Chinese Patent Office in Chinese Application No. 201880024006.9.
Communication dated Aug. 26, 2021 by the Chinese Patent Office in Chinese Application No. 201880024107.6.
Communication dated Aug. 4, 2021 by the Chinese Patent Office in Chinese Application No. 201880024289.7.
Communication dated Jul. 26, 2021 by the Chinese Patent Office in Chinese Application No. 201880024059.0.
Communication dated Jul. 16, 2021 by the Chinese Patent Office in Chinese Application No. 201880024367.3.
Communication dated Jul. 19, 2021 by the Chinese Patent Office in Chinese Application No. 201880024070.7.
Office Action dated May 9, 2023, issued in Japanese Application No. 2022-086448.
Office Action issued Sep. 29, 2021 in Chinese Application No. 201880024311.8.
Office Action issued Sep. 24, 2021 in Chinese Application No. 201880024010.5.
Office Action issued Sep. 29, 2021 in Chinese Application No. 201880024276.X.
Office Action issued Oct. 28, 2021 in Chinese Application No. 201880046418.2.
Extended European Search Report issued Oct. 27, 2021 in European Application No. 18844735.3.
Office Action issued Sep. 17, 2021 in Chinese Application No. 201880030699.2.
International Preliminary Report on Patentability (Chapter I) issued on Jun. 18, 2019 for PCT/KR2017/012486 and its English translation from WIPO.
Office Action issued Jul. 23, 2024 in Chinese Application No. 202211609705.4.
Communication issued May 21, 2024 in European Application No. 17 880 867.1.
Office Action issued Jun. 20, 2024 in Filipino Application No. 1/2020/551224.
Office Action issued Jul. 17, 2024 in Filipino Application No. 1/2019/502406.
Communication issued Mar. 25, 2025 in Japanese Application No. 2023-021861.
Communication issued Mar. 21, 2025 in Chinese Application No. 202211563176.9.
Communication issued Jan. 23, 2025 in Chinese Application No. 202210724458.6.
Communication issued Jan. 9, 2025 in European Application No. 18805933.1.
Korean Office Action dated Jun. 1, 2023 in Korean Application No. 10-2022-0148790.
Ukrainian Office Action dated Jul. 12, 2023 in Ukrainian Application No. 11800/ZA/23.
European Office Action dated Jul. 10, 2023 in European Application No. 18785166.2.
Chinese Office Action dated Jul. 31, 2023 in Chinese Application No. 201880050526.7.
Chinese Office Action dated Apr. 12, 2024 in Application No. 201721768740.5.
Office Action issued Feb. 2, 2024 in Chinese Application No. 202010760990.4.
Office Action issued Apr. 23, 2024 in Japanese Application No. 2023-021861.
Office Action issued Mar. 18, 2024 in Ukrainian Application No. a 2021 05048.
Office Action issued Apr. 23, 2024 in Japanese Application No. 2023-006805.
Communication dated Dec. 6, 2023, issued in European Application No. 20 188 985.4.
Communication dated Dec. 21, 2023, issued in Ukrainian Application No. a 2021 05048.
Communication dated Nov. 3, 2023, issued in European Application No. 18 775 504.6.
Communication dated Dec. 27, 2023, issued in Chinese Application No. 202010763214.X.
Communication dated Nov. 3, 2022, issued in Chinese Application No. 201880024276.X.
Communication dated Dec. 1, 2023, issued in Chinese Application No. 201880050526.7.
Chinese Office Action dated Jan. 30, 2024 in Application No. 201721768336.8.
Chinese Office Action dated Jan. 30, 2024 in Application No. 201721768739.2.
Communication dated Feb. 13, 2026 in European Application No. 18854661.8.
Communication dated Feb. 24, 2026 in European Application No. 18854661.8.
"IQOS", Tech Insights, May 5, 2017, Teardown.com, pp. 1-65 (65 pages).
"Was ist IQOS und wie gesundheitsschädlich ist es?" Screenshot of Youtube Video, Stiftung Warentest, 2017, https://www.youtube.com/watch?v=bS3uVBvVyAI, (4 pages).
Communication issued Nov. 11, 2025 in Japanese Patent Application No. 2023-021861.
Communication issued Nov. 7, 2025 in Japanese Patent Application No. 2023-021861.
Communication dated Jul. 1, 2025, issued in Chinese application No. 201721768336.8.
Communication dated Jan. 24, 2026 in Chinese Application No. 202211696170.9.
Communication dated Nov. 28, 2025 issued by the State Intellectual Property Office of the P.R.China in application No. 202211563176.9.
Communication dated Apr. 24, 2026, issued in Russian Application No. 2025131426.
Communication dated May 13, 2026, issued in European Application No. 17 880 867.1.
Communication dated Jun. 2, 2026, issued in Japanese Application No. 2025-124190.

* cited by examiner

REMAINING NUMBER OF AVAILABLE PUFFS – FIVE TIMES

REMAINING NUMBER OF AVAILABLE PUFFS – THREE TIMES

REMAINING NUMBER OF AVAILABLE PUFFS - ONCE

AEROSOL GENERATING DEVICE AND METHOD FOR PROVIDING ADAPTIVE FEEDBACK THROUGH PUFF RECOGNITION

CROSS REFERENCE TO RELATED APPLICATIONS

This application is a Continuation of U.S. patent application Ser. No. 16/604,420, filed Oct. 10, 2019, which is a National Stage of International Application No. PCT/KR2018/004118 filed Apr. 9, 2018, claiming priority based on Korean Patent Application No. 10-2017-0046938, filed Apr. 11, 2017, Korean Patent Application No. 10-2017-0077586, filed Jun. 19, 2017, and Korean Patent Application No. 10-2017-0084389, filed Jul. 3, 2017.

TECHNICAL FIELD

The present disclosure relates to an aerosol generating device, and more particularly, to an aerosol generating device in which a variety of feedback is provided through recognition of a user's puff.

BACKGROUND ART

In conventional smoking articles, an aerosol generating material is directly burned during use to generate aerosol. However, direct combustion of an aerosol generating material may generate undesired volatile compounds, which can cause health problems. Thus, various aerosol-generating devices have recently been developed, which provide flavors of a cigarette without undesired volatile compounds by heating instead of burning an aerosol generating material.

However, such aerosol-generating devices may not provide enough satisfaction to users compared to conventional combustion-type cigarettes. For example, an aerosol-generating device provides rather different feelings from those provided by conventional combustion-type cigarettes, and there may also be a difference in the number of puffs and an amount of generated aerosol material.

Thus, there is a need for a method of enabling a user to experience a similar feeling to smoking when using an aerosol-generating device.

DESCRIPTION OF EMBODIMENTS

Technical Problem

The present disclosure provides adaptive feedback through recognition of user's puff.

Solution to Problem

According to an aspect of the present disclosure, a device includes: a battery configured to supply power; a heater configured to heat an aerosol generating material; a sensor; at least one output unit; and a controller, wherein the controller detects a user's puff by using the sensor and controls the at least one output unit based on puff characteristic data corresponding to a result of the detection.

The sensor may further include a temperature sensor measuring a temperature of the heater, and the controller may detect a user's puff by measuring a variation in the temperature of the heater by using the temperature sensor.

The sensor may further include a flux sensor, and the controller may detect a user's puff by measuring a variation in flux in the device by using the flux sensor.

The puff characteristic data may include at least one of a puff strength, a puff interval, and a number of puffs.

The controller may predict the number of available puffs based on the power of the battery or an amount of an aerosol generating material, and modifies the predicted number of available puffs based on the puff characteristic data.

The controller may output the modified number of available puffs by using the at least one output unit.

The controller may determine a remaining number of puffs according to the puff characteristic data and control an output strength of a vibration motor based on the determined remaining number of available puffs.

The controller may determine a remaining number of puffs according to the puff characteristic data and control an emission intensity or a flickering interval of an LED lamp based on the determined remaining number of available puffs.

The controller may determine a remaining number of puffs according to the puff characteristic data and control a sound output intensity or a type of output sound based on the determined remaining number of available puffs.

The device may further include an external casing, and the controller may control a temperature of the external casing based on a heater temperature at the time of a puff.

The controller may predict a remaining number of available puffs based on a measured puff strength and an estimated remaining battery power and output the predicted remaining number of available puffs.

The controller may control the at least one output unit to provide a notification to a user each time the temperature of the heater is raised to a certain temperature or higher.

The controller may control the at least one output unit to provide a notification to a user based on a measured puff strength or a measured puff interval.

The controller may control the at least one output unit to notify a user, at certain intervals, that puffing is possible.

According to an aspect of the present disclosure, a method of controlling a device, includes: detecting a user's puff by using a sensor; acquiring puff characteristic data based on a result of the detecting; and controlling at least one output unit based on the puff characteristic data.

The method may further include: predicting the number of available puffs based on a battery power or an amount of an aerosol generating material; and modifying the predicted number of available puffs based on puff characteristic data.

The method may further include outputting the modified number of available puffs by using the at least one output unit.

According to an aspect of the present disclosure, a computer-readable recording medium having recorded thereon a program for executing the method described above on a computer is provided.

Advantageous Effects of Disclosure

According to embodiments of the present disclosure, a feedback method based on puff recognition is provided to provide with satisfaction and also required information to users of a device.

BEST MODE

Figure 1:
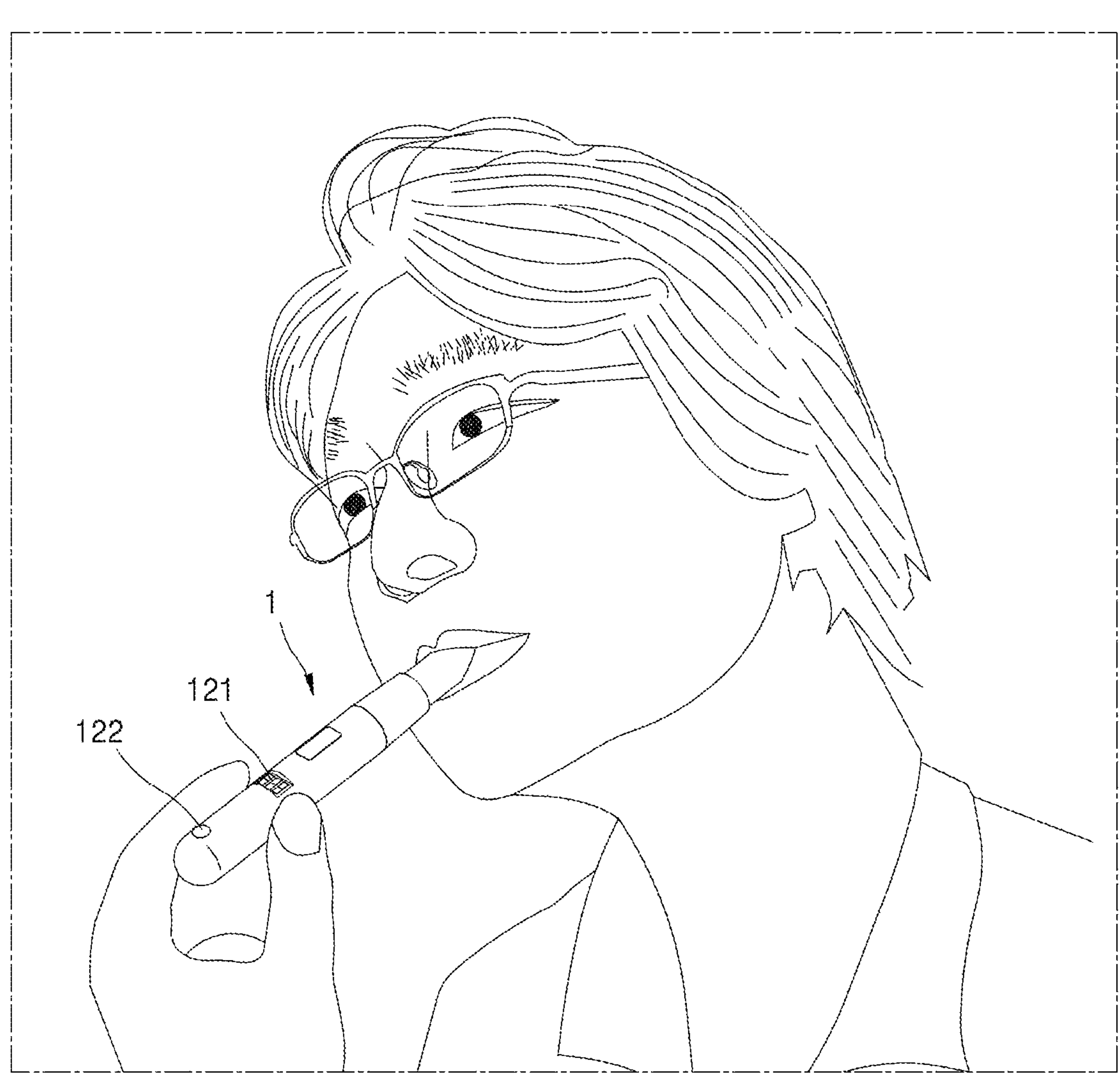
FIG. 1 illustrates the outer appearance of a holder according to some embodiments.

According to one or more embodiments, a holder includes: a battery configured to supply power; a heater configured to heat an aerosol generating material; a sensor; at least one output unit; and a controller, wherein the controller detects a user's puff by using the sensor and controls the at least one output unit based on puff characteristic data corresponding to a result of the detection.

MODE OF DISCLOSURE

With respect to the terms in the present disclosure, the general terms which are currently and widely used are selected in consideration of functions of structural elements in the various embodiments of the present disclosure. However, meanings of the terms may be changed according to intention, a judicial precedent, appearance of new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

Throughout the specification, when a part is connected to another part, this includes not only the case where the part is directly connected, but also the case where the part is electrically connected to the other part with another element therebetween. In addition, unless explicitly described to the contrary, the word "comprise" and variations such as "comprises" or "comprising" will be understood to imply the further inclusion of other elements but not the exclusion of any other elements. In addition, the terms "-er", "-or", and "module" described in the specification mean units for processing at least one function and operation and can be implemented by hardware components or software components and combinations thereof.

Throughout the specification, an aerosol generating material refers to a material capable of generating an aerosol and may also refer to an aerosol-forming substrate. Aerosols may include volatile compounds. An aerosol generating material may be solid or liquid.

For example, a solid aerosol generating material may include a solid material based on tobacco raw materials such as tobacco sheet, cut tobacco leaves, reconstituent tobacco, or the like, and a liquid aerosol generating material may include a liquid material based on nicotine, tobacco extracts, and various flavoring agents. However, the aerosol generating material is not limited to the above examples.

Throughout the specification, an aerosol generating device (hereinafter referred to as a 'holder') may be a device that generates an aerosol by using an aerosol generating material to generate an aerosol that can be directly inhaled into the user's lungs through the user's lips. The terms 'aerosol generating device' and 'holder' may be used interchangeably.

Throughout the specification, the term "puff" indicates inhalation by a user, and the inhalation may refer to a situation where an aerosol is drawn into the oral cavity, the nasal cavity, or the lungs of the user through the user's lips or nose.

Through the specification, puff characteristic data may include information on a puff strength, a puff interval, and the number of puffs. For example, the puff characteristic data may include information about a strength of a user's puff, a time interval between a user's puffs, the remaining number of available puffs, and the total number of current puffs, and the like, but is not limited to the above examples.

FIG. 1 illustrates the outer appearance of a holder according to some embodiments.

According to the example shown in FIG. 1, the holder 1 may be in the form of a stick. The user may use the holder 1 by inserting the same between fingers like a conventional cigarette. In addition, the holder 1 may be in the form of a holder. That is, an aerosol may be generated as a solid aerosol generating material 3 is inserted into the holder 1 and heated. According to some embodiments, the solid aerosol generating material 3 may be a cigarette. The terms 'cigarette' and 'aerosol generating material 3' may be used interchangeably. The operation performed as the aerosol generating material 3 is inserted into the holder 1 and the structure of the cigarette will be described in more detail below.

According to some embodiments, once an aerosol is generated, the generated aerosol may be delivered to a user through a filter. The filter may be provided in the holder 1 or attached to the aerosol generating material 3, but is not limited to the above examples.

Also, according to some embodiments, the holder 1 may include at least one output unit for providing feedback to the user. For example, the holder 1 may include an LED display window 121 or an LED lamp 122, but is not limited to the above examples. Description of at least one output unit included in the holder 1 will be described in more detail below.

In addition, according to some embodiments, the holder 1 may be turned on or off by a user input, or may be turned on when a user's puff is detected. An operation when the holder 1 is turned on will be described with reference to FIG. 2 below.

Also, in some embodiments, the holder 1 may be coupled to a cradle. Details of a cradle will be described in detail below with reference to the following drawings.

Figure 2:
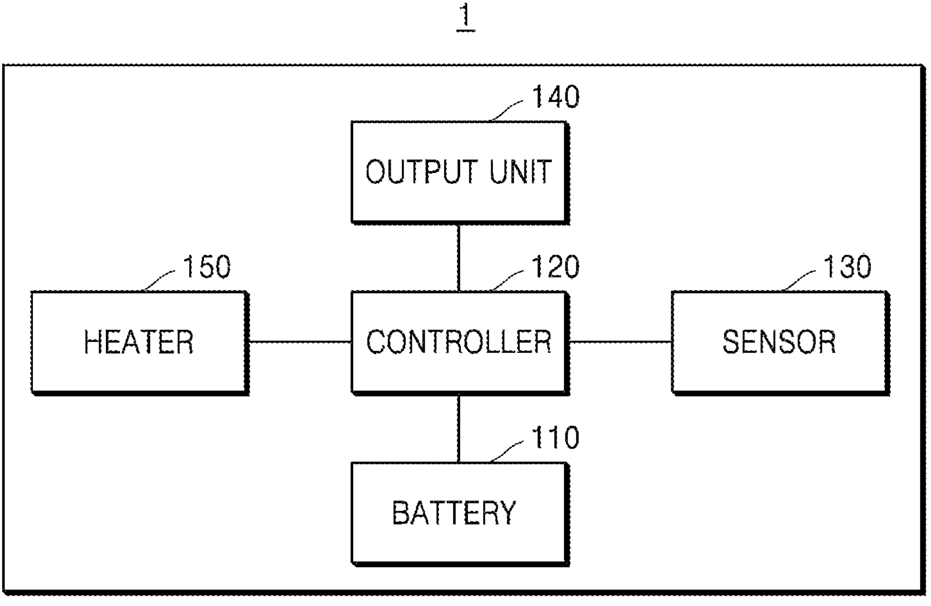
FIG. 2 is a block diagram of a holder according to some embodiments.

FIG. 2 is a block diagram of the holder 1 according to some embodiments.

The holder 1 illustrated in FIG. 2 may include a battery 110, a controller 120, a sensor 130, an output unit 140, and a heater 150. However, not all components shown in FIG. 2 are essential components of the holder 1. The holder 1 may be implemented by more components than those shown in FIG. 2, or the holder 1 may be implemented by fewer components than those shown in FIG. 2.

According to some embodiments, the controller 120 is configured to control the overall operation of the holder 1. The controller 120 may include a microprocessor, a microcontroller, and an IC circuit including the same, but is not limited thereto.

According to some embodiments, the controller 120 may detect a user's puff by using the sensor 130. In addition, the controller 120 may acquire puff characteristic data according to a puff detection result. The controller 120 may control the output unit 140 based on the puff characteristic data.

According to some embodiments, the holder 1 may include the output unit 140. The output unit 140 may include a display such as an LED display, an LED lamp, a motor, a speaker, a temperature controller, and the like, but is not limited to the above examples. Also, the holder 1 may include at least one output unit 140. For example, one holder 1 may include an LED display, an LED lamp, and a motor altogether.

According to some embodiments, the controller 120 may control the output unit 140 based on puff characteristic data.

For example, the controller 120 may predict the remaining number of available puffs, recognize a user's puff, and output the remaining number of puffs which is the number of puffs of the user subtracted from the remaining number of available puffs. That is, the controller 120 may output the changed number of available puffs. The controller 120 may predict the remaining number of available puffs based on a battery power, an amount of an aerosol generating material (e.g., cigarette).

In addition, according to some embodiments, the controller 120 may control the output strength of a vibration motor based on the remaining number of available puffs. For example, as the remaining number of available puffs decreases, the controller 120 may control the output of the vibration motor to be stronger. The reverse is also possible, and the controller 120 may control the vibration motor to vibrate by as much as the remaining number of puffs.

In addition, the controller 120 may control a light emission intensity or a flickering interval of the LED lamp based on the remaining number of available puffs. For example, the smaller the remaining number of available puffs, the controller 120 may control the output of the LED lamp to be stronger. The reverse is also possible, and the controller 120 may control the LED lamp to flicker faster as the remaining number of puffs decreases.

In addition, the controller 120 may control the sound output intensity or the type of output sound based on the remaining number of available puffs. For example, the smaller the remaining number of available puffs, the controller 120 may control the sound output unit 140 such as a speaker such that the output of the sound increases. In addition, the controller 120 may control the sound output unit 140 to output one of various kinds of sounds, such as a wind sound and a paper burning sound.

In addition, the controller 120 may control a temperature of the casing outside the holder based on the temperature of the heater 150 at the time of a puff. Even though the temperature of the heater 150 is high, there is a possibility that a user using the holder is not aware of the high temperature of the heater 150. Thus, by increasing the temperature of the external casing, the user may be notified of the temperature of the heater 150 through the variation in the temperature of the casing.

In addition, the controller 120 may provide a notification to the user whenever the heater 150 is raised to a predetermined temperature or higher. As optimal aerosol that may satisfy a user (for example, in respect of the size of generated aerosol particles, the amount of generated aerosol, the temperature of the generated aerosol, etc.) may be provided when a temperature of the heater 150 is equal to or higher than a certain temperature, and thus, in order that the user may puff optimal aerosol, the controller 120 may notify the user to puff by controlling the output unit 140 when the temperature of the heater 150 is raised to a certain temperature or higher.

In addition, the controller 120 may control the output unit 140 to inform, at predetermined intervals, the user that puffing is possible. That is, the controller 120 may provide a notification to the user to puff at predetermined time intervals in order to provide an optimal aerosol.

According to some embodiments, the controller 120 may also control the output unit 140 to provide a notification to the user based on a measured puff strength or a measured puff interval. Too strong puffs or too short intervals of puffs make it difficult to provide a satisfactory aerosol. Thus, if a user has puffed too strongly or an interval between puffs is too short, a notification may be given to the user by controlling the output unit 140 so that the user may keep a puff strength and a puff interval according to certain standards.

The sensor 130 may be various types of sensors, and may include at least one sensor. For example, the sensor 130 may include a flux sensor and a temperature sensor.

According to some embodiments, the controller 120 may measure a temperature of the heater 150 by using a temperature sensor. The temperature sensor may be a sensor for measuring the air temperature around the heater, or may be a sensor for determining a heater temperature by using a conductive track of the heater. The controller 120 may detect a user's puff by measuring the temperature of the heater 150.

According to some embodiments, the controller 120 may measure the flow and/or flux of air, gas, and aerosol in the holder by using a flux sensor. The controller 120 may detect a user's puff by measuring a variation in the flux. The general configuration of the controller 120 will be described in more detail below.

According to some embodiments, the heater 150 may be configured to heat an aerosol generating material (e.g., a cigarette or liquid) by power supplied from the battery 110. The temperature of the heater 150 may be set differently according to the type of aerosol generating material. In detail, a temperature of the heater 150 may vary depending on whether the aerosol generating material is a solid or a liquid, and may be different according to a thickness and materials of the aerosol generating material when the aerosol generating material is a solid. The battery 110 will be described in more detail below.

In addition, the heater 150 may be configured in various shapes. The heater may be a tubular heater, a plate-shaped heater, or a needle- or rod-shaped heater. The heater 150 may heat the inside or outside of the aerosol generating material according to its shape. The configuration for the heater 150 will be described in more detail below.

According to some embodiments, the controller 120 may control the heater 150 and the battery 110. In detail, the controller 120 may preheat the heater 150 to a predetermined temperature and perform power saving by controlling the battery 110. In addition, the controller 120 may control the battery 110 and the heater 150 in various different modes by using profiles stored therein.

For example, the controller 120 control the battery 110 and the heater 150 in different modes such as a power-saving mode, a preheating mode, a normal inhalation mode, or an amplified inhalation mode in which more aerosol is generated at a higher temperature than the normal inhalation mode but more power is used, but is not limited to the above examples.

According to some embodiments, the battery 110 may include at least one power source. For example, the battery 110 may include at least one battery. The battery 110 may be charged by using an external charging device, and a charging method is not limited. In addition, when the battery 110 is charged, the power of the holder may be automatically turned off or may operate in a power save mode.

In addition, the holder 1 may further include a memory (not shown). The memory may store user information, data for temperature control such as profiles, puff characteristic data, and the like.

Figure 3:
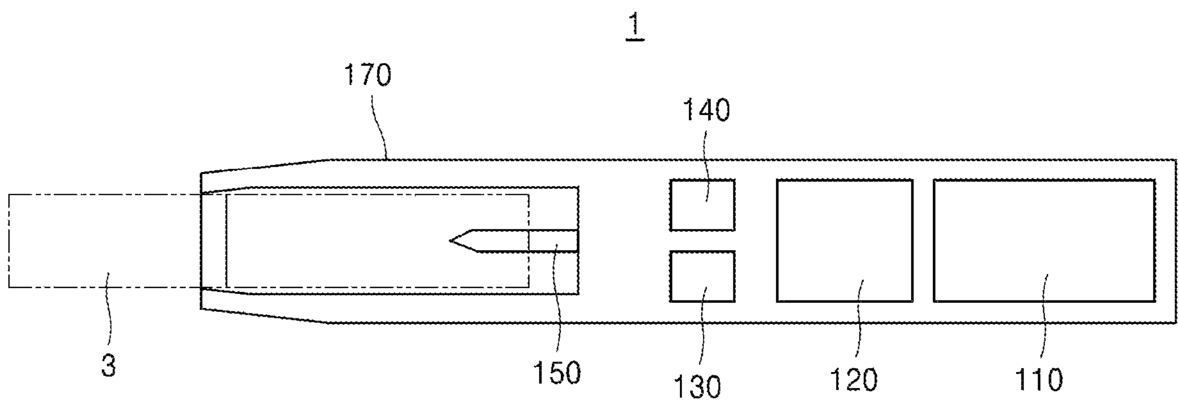
FIGS. 3 and 4 are conceptual diagrams of a holder according to some embodiments.
Figure 4:
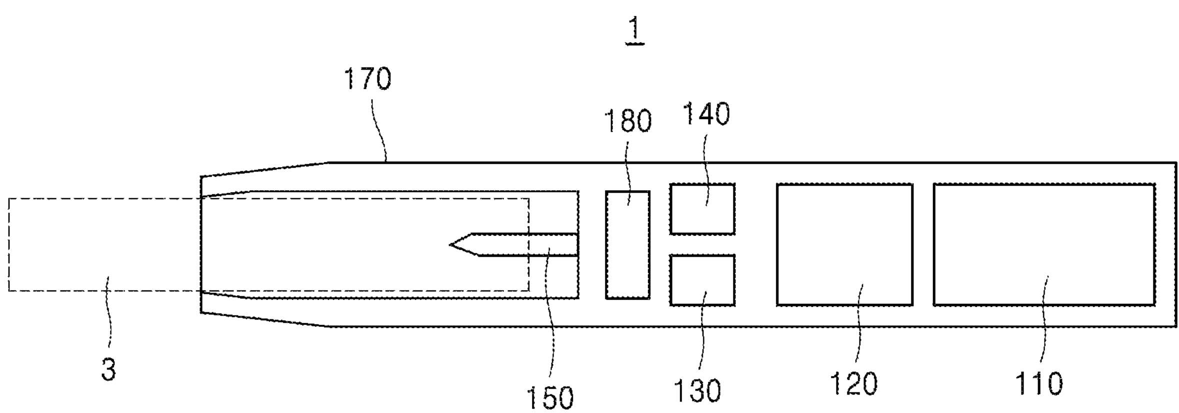

FIGS. 3 and 4 are conceptual diagrams of a holder according to some embodiments.

Referring to FIG. 3, the holder 1 may include an external casing 170. In the external casing, a battery 110, a controller 120, a sensor 130, an output unit 140, and a heater 150 may be included. In addition, a solid aerosol generating material 3 may be inserted from the outside of the holder 1. The components correspond to those described above with reference to FIG. 2, and thus description thereof will be omitted.

Compared with FIG. 4, the holder 1 of the embodiment of FIG. 4 further includes a liquid storage unit 180. The liquid storage unit 180 contains a liquid aerosol generating material. The holder 1 of FIG. 4 may generate an aerosol generating material by heating a solid aerosol generating material and a liquid aerosol generating material simultaneously, alternately, and/or sequentially.

In addition, the holder 1 of FIG. 4 may heat a liquid aerosol generating material by using an additional heater, and the configuration of the heater heating a liquid aerosol generating material and a solid aerosol generating material is not limited. Hereinafter, the concept of an additional holder will be further illustrated and described in the following drawing.

Figure 5:
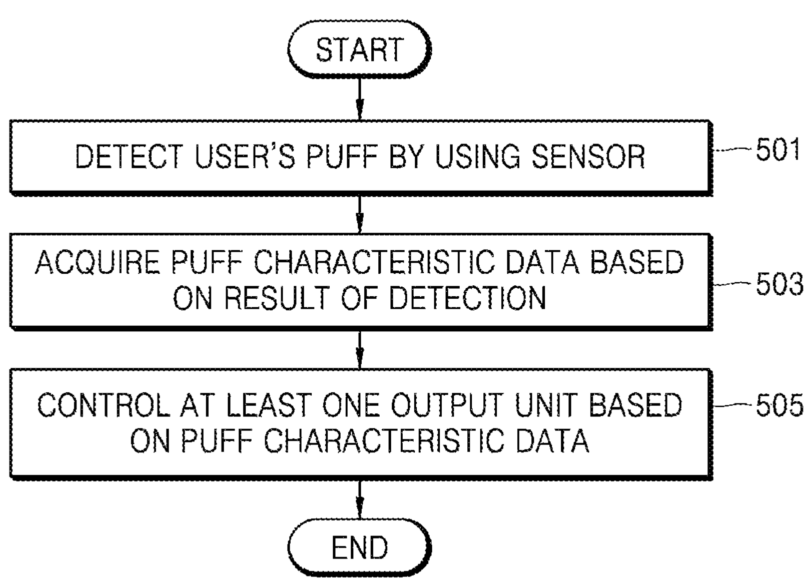
FIG. 5 illustrates a control method of a holder which detects puffs and controls an output unit, according to some embodiments.

FIG. 5 illustrates a control method of a holder which detects puffs and controls an output unit, according to some embodiments.

In operation 501, the holder may detect a user's puff by using a sensor. The holder may detect a user's puff by using a flux sensor, a temperature sensor, or the like.

According to some embodiments, the holder may detect, by using a flux sensor, a user's puff by determining an amount of air introduced into the holder or an amount of gas discharged from the holder.

In addition, the holder may detect a user's puff by measuring a temperature of a heater by using a temperature sensor and determining a variation in the temperature of the heater. Furthermore, the holder may detect a user's puff by using a pressure sensor, and methods whereby the holder detects a user's puff are not limited to the above examples.

In operation 503, the holder may acquire puff characteristic data based on a detection result.

According to some embodiments, puff characteristic data may include information about a puff strength, a puff interval, and the number of puffs. In detail, puff characteristic data may include information about a pressure at the time of a user's puff (puff intensity and strength), a time interval between a first puff and a second puff, a remaining number of available puffs, and a total number of current puffs. A total number of current puffs may indicate a number of puffs counted after the holder is turned on or after an aerosol generating material is inserted, and is not limited to the above examples.

According to some embodiments, the holder may detect at least one puff of a user, and acquire information about a puff strength, a puff interval, and the number of puffs.

In operation 505, the holder may control at least one output unit based on puff characteristic data.

According to some embodiments, the holder may control an output unit based on the remaining number of available puffs. For example, when the remaining number of available puffs is equal to or greater than a certain number, the holder may control a vibration motor to vibrate weakly; when the remaining number of available puffs is equal to or less than a certain number, the holder may control a vibration motor to vibrate strongly.

In addition, as the remaining number of available puffs decreases, the holder may control a flickering interval of an LED lamp to shorten or to increase an emission intensity of the LED lamp.

In addition, according to some embodiments, the holder may control an output unit based on a puff strength. For example, the holder may control the puff strength and the vibration intensity of a vibration motor to be proportional to each other. Methods whereby the holder controls at least one output unit based on puff characteristic data are not limited, and the description provided with reference to FIG. 2 may also be included herein.

Figure 6:
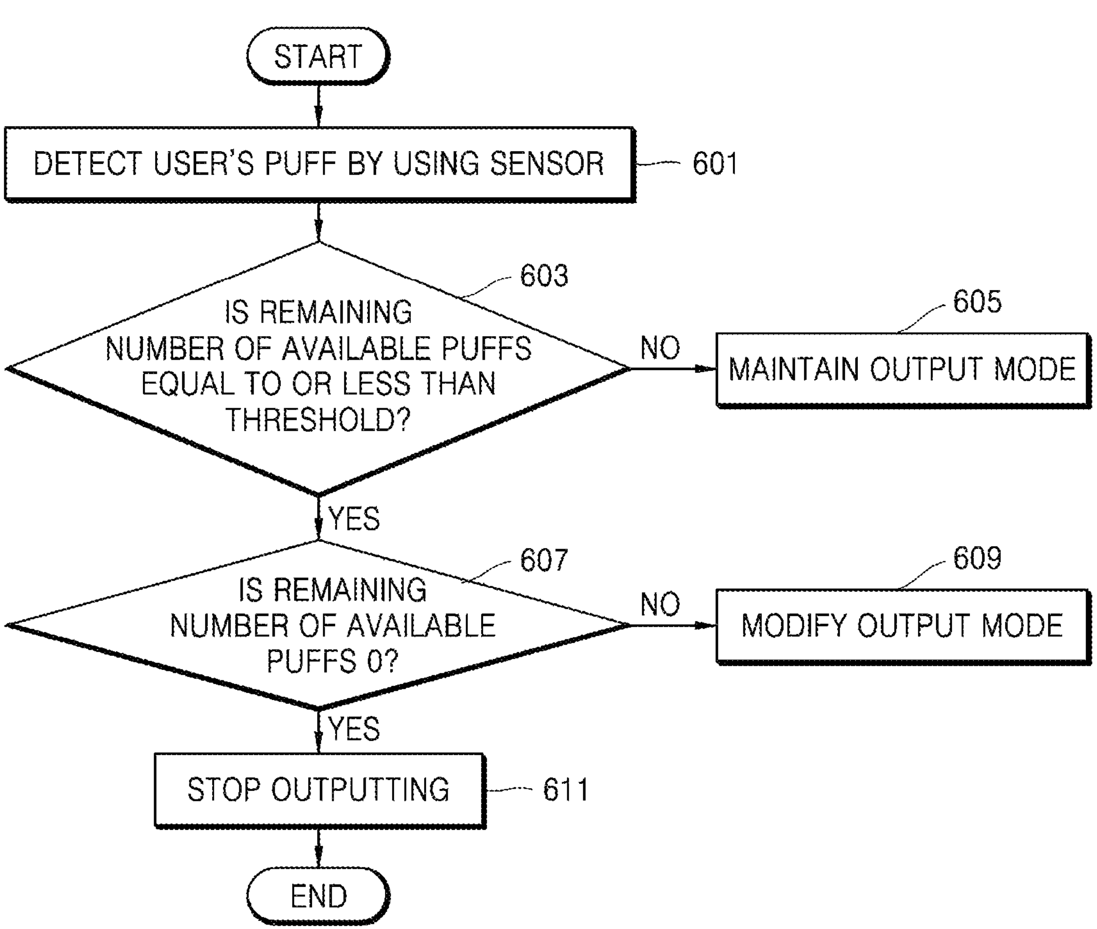
FIG. 6 illustrates a method by which an output mode is controlled according to the remaining number of available puffs, according to some embodiments.

FIG. 6 illustrates a method by which an output mode is controlled according to the remaining number of available puffs, according to some embodiments.

In operation 601, the holder may detect a user's puff by using a sensor. This is as described above, and thus detailed description thereof will be omitted.

In operation 603, the holder may determine whether the remaining number of available puffs is equal to or less than a threshold.

According to some embodiments, the holder may predict the remaining number of available puffs. The holder may predict the remaining number of available puffs based on an amount of aerosol generating material, a battery power, a reference puff strength, the number of user's puffs or the like.

In addition, the remaining number of available puffs may vary according to a puff strength of a user, a puff interval. For example, when an initial remaining number of available puffs predicted by the holder based on the amount of an aerosol generating material and a battery power is assumed to be eight times, after the user has puffed twice, the remaining number of available puffs may be predicted to be five times instead of six, depending on the user's puff strength and the puff interval. That is, the holder may calculate a remaining number of available puffs based on puff characteristic data.

According to some embodiments, the holder may determine whether the calculated remaining number of available puffs is equal to or greater than a threshold or equal to or less than a threshold. Also, the holder may output the calculated remaining number of available puffs. The holder may output the remaining number of available puffs via an LED display or an LED lamp.

In operation 605, the holder may maintain an output mode when the remaining number of available puffs is equal to or greater than a threshold. An output mode may refer to a mode in which the holder controls at least one output unit.

For example, output mode step 1 may refer to step 1 emission mode of an LED lamp and a step 1 vibration mode of a vibration motor, and output mode step 2 may refer to step 2 emission mode of the LED lamp and step 2 vibration mode of the vibration motor, but are not limited to these examples.

That is, an output mode may refer to a combination of modes in which at least one output unit included in the holder is output. In detail, an emission mode of an LED lamp may refer to a flickering intensity and a flickering interval of a certain LED, and a vibration mode of a vibration motor may refer to a certain vibration intensity and vibration interval but are not limited to these examples.

According to some embodiments, the holder may maintain an output mode when the remaining number of available puffs is equal to or greater than a threshold. That is, the holder may not change the output mode. For example, when the remaining number of available puffs is equal to or greater than four times, the holder may maintain an output mode at step 1.

In operation 607, when the remaining number of available puffs is equal to or less than a threshold, the holder may determine whether the remaining number of available puffs is 0 times. For example, when the remaining number of available puffs is determined to be four times or less, the holder may determine whether the remaining number of available puffs is 0 times.

In operation 609, the holder may modify an output mode when the remaining number of available puffs is not 0 times. For example, when the remaining number of available puffs is not 0 times but fewer than four times, the holder may change the output mode to step 2.

Also, in operation 611, the holder may stop the output mode when the remaining number of available puffs is 0 times. That is, the holder may stop flickering of the LED and also stop vibration of the vibration motor.

Obviously, the holder does not completely stop the output mode but may modify the output mode, and notify the need for removing or replacing an aerosol generating material or the need for charging, by using a different output unit from the output unit used in a previous output mode. For example, when the remaining number of available puffs is 0 times, the holder may no longer use the LED lamp and the vibration motor, but use an LED display to notify a user to remove or replace an aerosol generating material or charge the holder.

Figure 7:
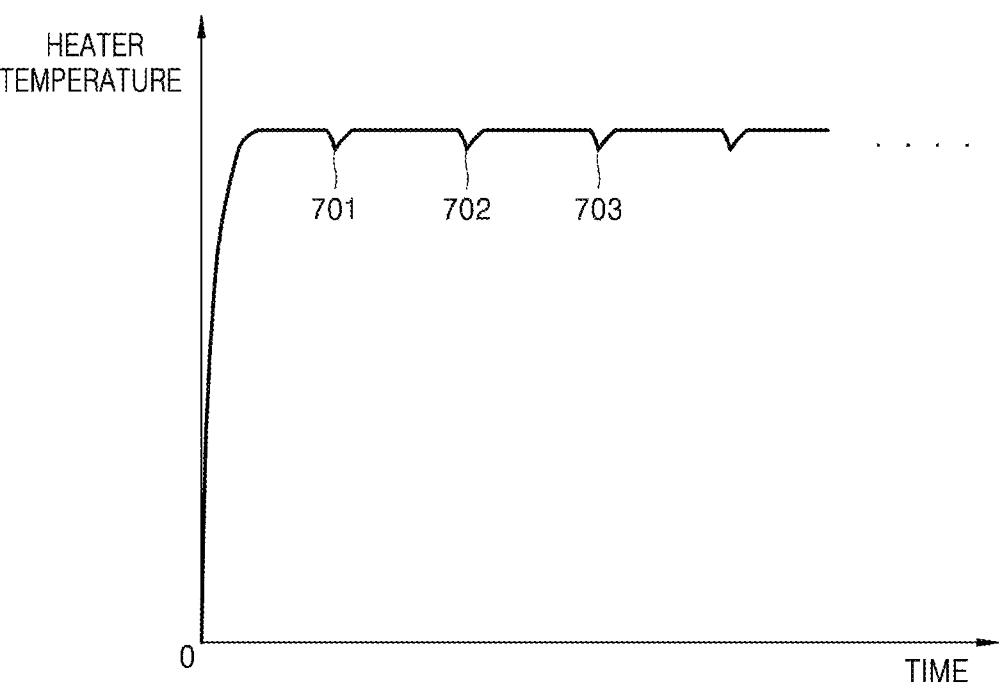
FIG. 7 illustrates a variation in a heater temperature according to puffs, according to some embodiments.

FIG. 7 illustrates a variation in a heater temperature according to puffs, according to some embodiments As described above, an operation in which a user inhales aerosol generated using the holder may be referred to as a puff.

According to some embodiments, at time of a puff, not only aerosol generated from an aerosol generating material by using the holder through heating is transferred to the user, but a mixture of the air introduced to the outside through the holder and the generated aerosol may be transferred to the user.

According to some embodiments, the holder may detect a user's puff by using various methods. For example, the holder may detect a user's puff by measuring a variation in a pressure in the holder, by using a pressure sensor. The holder may also detect a user's puff by measuring a heater temperature, without including an additional pressure sensor.

A heater temperature may vary at the time of each puff of a user. As the air of a lower temperature than a heater temperature is introduced at the time of a puff, the heater temperature decreases. Referring to FIG. 7, a decrease in a heater temperature at the time of a first puff 701 where the user inhales aerosol first time is shown.

Next, the holder raises the heater temperature to a certain temperature by supplying power to the heater. At the time of a second puff 702 and a third puff 703, also, the heater temperature may also decrease as at the time of the first puff 701. By measuring the heater temperature, the holder may detect that a puff has occurred when the heater temperature has lowered. In addition, since the heater temperature has decreased at the time of a puff, the holder may supply electricity to the heater to raise the heater temperature to a certain temperature again.

Figure 8:
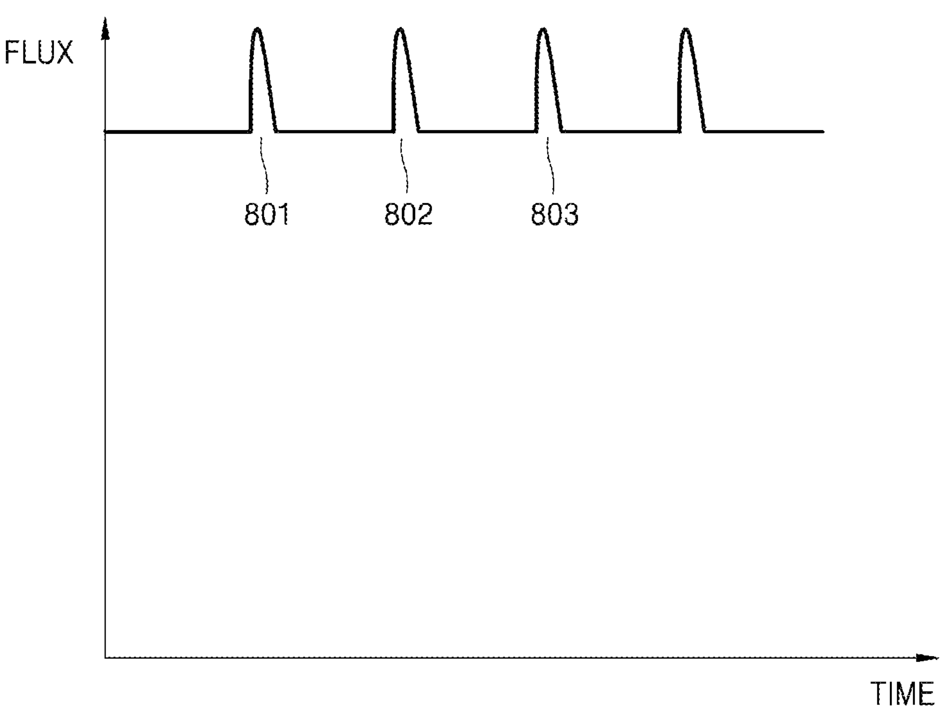
FIG. 8 illustrates a variation in flux according to puffs, according to some embodiments.

FIG. 8 illustrates a variation in a flux according to puffs, according to some embodiments.

According to some embodiments, at the time of a puff, not only aerosol generated from an aerosol generating material by using the holder through heating is transferred to the user, but a mixture of the air introduced to the outside through the holder and the generated aerosol may be transferred to the user. Thus, the holder may detect a user's puff from a variation in a flux in the holder.

The flux may vary at the time of each puff. At the time of a puff, the air is introduced from the outside of the holder, and thus, the flux in the holder is increased. Referring to FIG. 8, an increase in a flux at the time of a first puff 801 where a user inhales aerosol first time is shown.

At the time of a second puff 802 and a third puff 803, also, the flux may also increase like at the time of the first puff 801. The holder may measure a variation in the flux to detect that a puff has occurred when the flux has increased. Thus, without an additional pressure sensor, the holder may detect a puff based on a variation in the flux or in temperature. The holder may also detect a puff strength based on a degree of the variation in the flux or in the temperature.

Figure 9A:
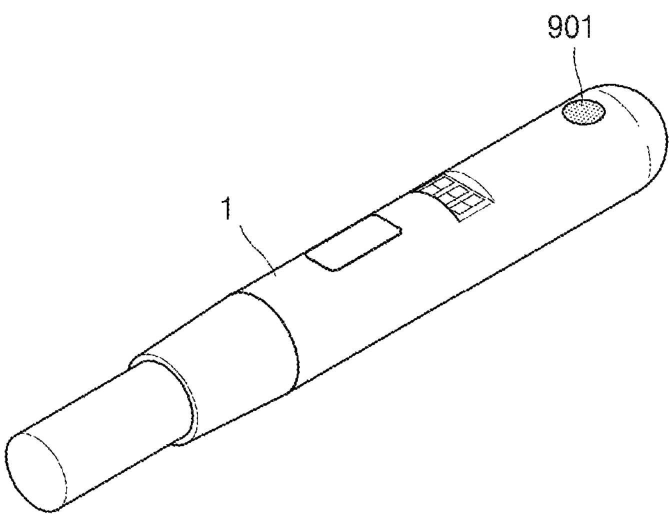
FIGS. 9A through 9C illustrate LED lamp output control according to the remaining number of available puffs, according to some embodiments.
Figure 9B:
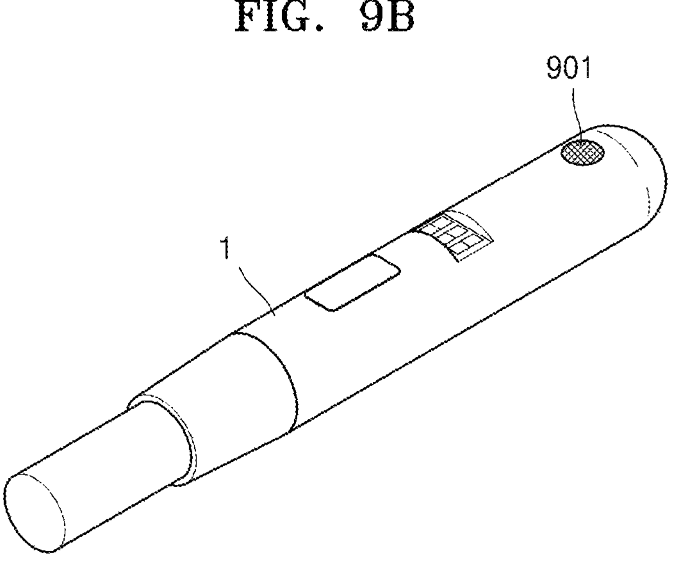
Figure 9C:
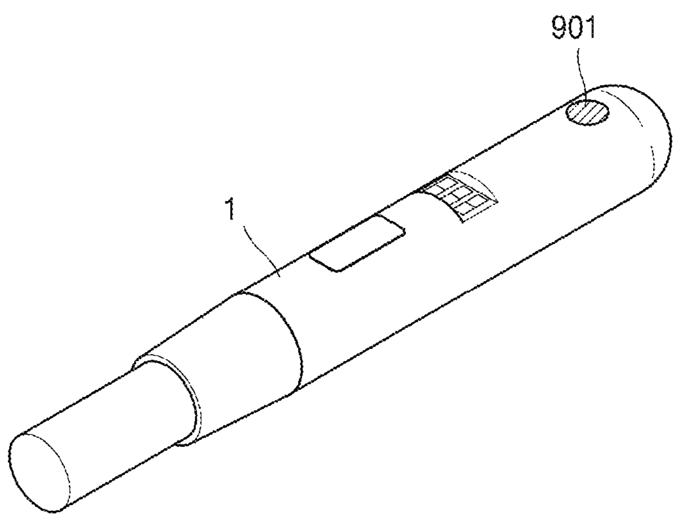

FIGS. 9A through 9C illustrate LED lamp output control according to the remaining number of available puffs, according to some embodiments.

As described above, the holder 1 may differentiate an output mode according to a remaining number of available puffs.

When the remaining number of available puffs is respectively five times, three times, and once as in FIGS. 9A through 9C, the holder 1 may differently control a color of flickering, a degree of flickering, and a flickering interval of a LED lamp 901. The LED lamp 901 of FIG. 9 may be identical to the LED lamp 122 of FIG. 1. Also, when a remaining number of available puffs is 0, the holder 1 may control the LED lamp not to flicker.

In addition, the holder 1 may control the LED lamp 901 to flicker only at the time of a puff. Also, the holder 1 may output a flickering intensity of the LED lamp 901 or output a sound for interaction with a user input made by using a power button or an input button.

Also, the holder 1 may control an LED lamp or a vibration motor to notify a user of insertion or discharge of an aerosol generating material. In other words, at least one output unit included in the holder 1 may be controlled to provide interaction with a user, provide feedback about a user's puff, and provide a notification to a user.

Figure 10:
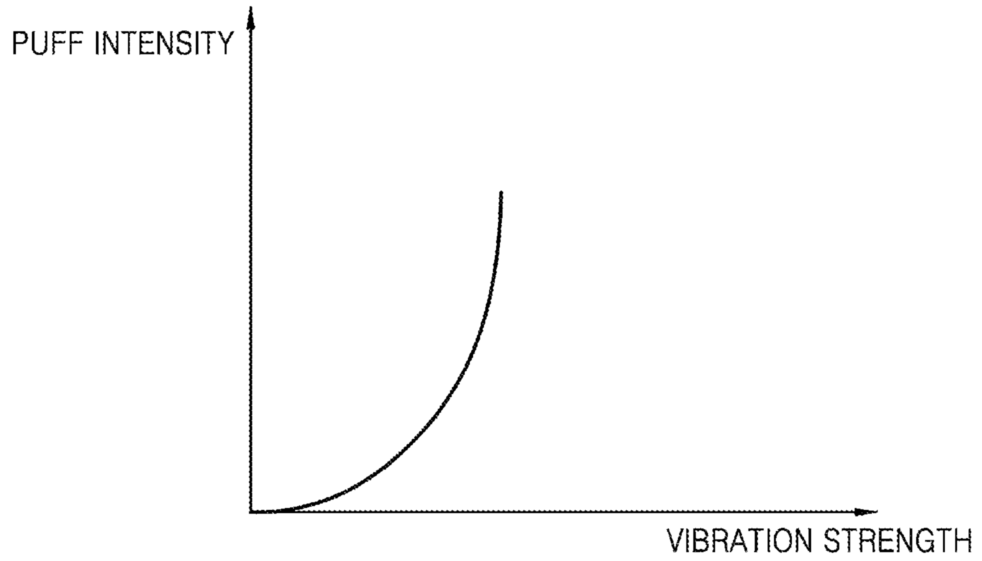
FIG. 10 illustrates a correlation between puff intensity and vibration strength, according to some embodiments.

FIG. 10 illustrates a correlation between puff intensity and vibration intensity according to some embodiments.

According to some embodiments, a user's puff intensity may be proportional to a vibration strength of a vibration motor in a holder. That is, a vibration strength may also be varied according to how strong a user puffs.

As illustrated in FIG. 10, when adjusting a vibration strength based on a puff intensity of a user, feedback about the puff intensity may be instantly provided to the user. An optimum aerosol is to be accompanied by an appropriate puff intensity, and by providing feedback about a puff intensity to a user from the holder through a vibration strength, the user may be encouraged to puff with an appropriate intensity.

The vibration strength may also be set to weaken as the puff intensity strengthens, in an opposite manner to that illustrated in FIG. 10, and the relationship between the vibration strength and the puff intensity is not limited. That is, any method that is sufficient to give a user feedback may be used.

Figure 11:
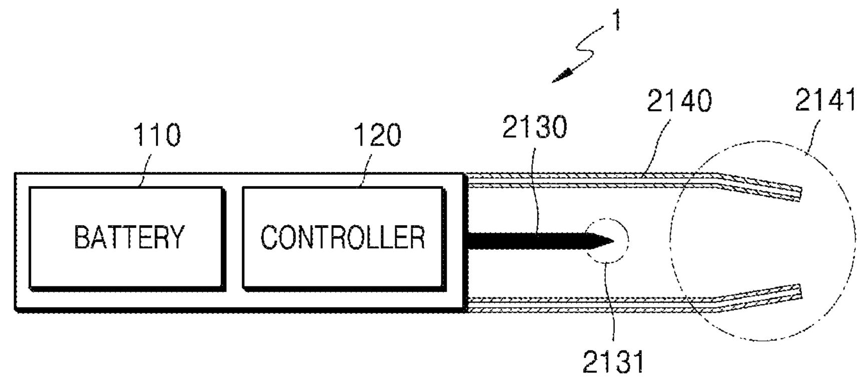
FIG. 11 is a block diagram showing an example of an aerosol generating apparatus.

FIG. 11 is a block diagram showing an example of an aerosol generating apparatus.

Referring to FIG. 11, an aerosol generating apparatus 1 (hereinafter referred to as a 'holder') includes a battery 110, a control unit 120, and a heater 2130. The holder 1 also includes an inner space formed by a casing 2140. A cigarette may be inserted into the inner space of the holder 1. The holder 1 illustrated in FIG. 11 may be another example of the holder 1 described above may partially or completely correspond to the configuration of the holder 1 described above.

Only components associated with the present embodiment are shown in the holder 1 shown in FIG. 11. Therefore, it will be understood by one of ordinary skill in the art that general components other than the components shown in FIG. 11 may be further included in the holder 1.

When a cigarette is inserted into the holder 1, the holder 1 heats the heater 2130. The temperature of an aerosol generating material in the cigarette is raised by the heated heater 2130, and thus aerosol is generated. The generated aerosol is delivered to a user through a cigarette filter. However, even when a cigarette is not inserted into the holder 1, the holder 1 may heat the heater 2130.

The casing 2140 may be detached from the holder 1. For example, when a user rotates the casing 2140 clockwise or counterclockwise, the casing 2140 may be detached from the holder 1.

The diameter of a hole formed by a terminal end 2141 of the casing 2140 may be smaller than the diameter of a space formed by the casing 2140 and the heater 2130. In this case, the hole may serve as a guide for a cigarette inserted into the holder 1.

The battery 110 supplies power used for the holder 1 to operate. For example, the battery 110 may supply power for heating the heater 2130 and supply power for operating the control unit 120. In addition, the battery 110 may supply power for operating a display, a sensor, a motor, and the like installed in the holder 1.

The battery 110 may be a lithium iron phosphate ($LiFePO_4$) battery, but is not limited to the example described above. For example, the battery 110 may be a lithium cobalt oxide ($LiCoO_2$) battery, a lithium titanate battery, etc.

Also, the battery 110 may have a cylindrical shape having a diameter of 10 mm and a length of 37 mm, but is not limited thereto. The capacity of the battery 110 may be 120 mAh or more, and the battery 110 may be a rechargeable battery or a disposable battery. For example, when the battery 110 is rechargeable, the charging rate (C-rate) of the battery 110 may be 10 C and the discharging rate (C-rate) may be 16 C to 20 C. However, the present disclosure is not limited thereto. Also, for stable use, the battery 110 may be manufactured, such that 80% or more of the total capacity may be ensured even when charging/discharging are performed 8000 times.

Here, it may be determined whether the battery 110 is fully charged or completely discharged based on a level of power stored in the battery 110 as compared to the entire capacity of the battery 110. For example, when power stored in the battery 110 is equal to or more than 95% of the total capacity, it may be determined that the battery 110 is fully charged. Furthermore, when power stored in the battery 110 is 10% or less of the total capacity, it may be determined that the battery 110 is completely discharged. However, the criteria for determining whether the battery 110 is fully charged or completely discharged are not limited to the above examples.

The heater 2130 is heated by power supplied from the battery 110. When a cigarette is inserted into the holder 1, the heater 2130 is located inside the cigarette. Therefore, the heated heater 2130 may raise the temperature of an aerosol generating material in the cigarette. The heater 2130 may be a component corresponding to the heater 150 described above.

The shape of the heater 2130 may be a combination of a cylindrical shape and a conical shape. For example, the heater 2130 may have a cylindrical shape having a diameter of about 2 mm and a length of about 23 mm, and a terminal end 2131 of the heater 2130 may be finished with an acute angle, but is not limited thereto. In other words, the heater 2130 may have any shape as long as the heater 2130 may be inserted into the cigarette. In addition, only a portion of the heater 2130 may be heated. For example, assuming that the length of the heater 2130 is 23 mm, only 12 mm from the terminal end 131 of the heater 2130 may be heated, and the remaining portion of the heater 2130 may not be heated.

The heater 2130 may include an electrically resistive heater. For example, the heater 2130 may include an electrically conductive track, and the heater 2130 may be heated as current flows in the electrically conductive track.

For stable use, the heater 2130 may be supplied with power according to the specifications of 3.2 V, 2.4 A, and 8 W, but is not limited thereto. For example, when power is supplied to the heater 2130, the surface temperature of the heater 2130 may rise to 400° C. or higher. The surface temperature of the heater 2130 may rise to about 350° C. before 15 seconds after the power supply to the heater 2130 starts.

An additional temperature sensing sensor may be provided in the holder 1. Alternatively, the holder 1 may not be provided with a temperature sensing sensor, and the heater 2130 may serve as a temperature sensing sensor. For example, the heater 2130 may further include a second electrically conductive track for temperature sensing in addition to the first electrically conductive track for generating heat.

For example, when a voltage applied to the second electrically conductive track and a current flowing through the second electrically conductive track are measured, a resistance R may be determined. At this time, a temperature T of the second electrically conductive track may be determined by Equation 1 below. The temperature sensing sensor may be an embodiment of the sensor 130 described above.

$$R=R_0\{1+\alpha(T-T_0)\} \quad \text{[Equation 1]}$$

In Equation 1, R denotes a current resistance value of the second electrically conductive track, R0 denotes a resistance value at a temperature T0 (e.g., 0° C.), and α denotes a resistance temperature coefficient of the second electrically conductive track. Since conductive materials (e.g., metals) have inherent resistance temperature coefficients, a may be determined in advance according to a conductive material constituting the second electrically conductive track. Therefore, when the resistance R of the second electrically conductive track is determined, the temperature T of the second electrically conductive track may be calculated according to Equation 1.

The heater 2130 may include at least one electrically conductive track (a first electrically conductive track and a second electrically conductive track). For example, the heater 2130 may include, but is not limited to, two first electrically conductive tracks and one or two second electrically conductive tracks.

An electrically conductive track includes an electro-resistive material. For example, an electrically conductive track may include a metal. In another example, an electrically conductive track may include an electrically conductive ceramic material, a carbon, a metal alloy, or a composite of a ceramic material and a metal.

In addition, the holder 1 may include both an electrically conductive track, which serves as temperature sensing sensors, and a temperature sensing sensor.

The controller 120 controls the overall operation of the holder 1. Specifically, the control unit 120 controls not only operations of the battery 110 and the heater 1230, but also operations of other components included in the holder 1. The controller 120 may also check the status of each of the components of the holder 1 and determine whether the holder 1 is in an operable state.

The controller 120 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

For example, the control unit 120 may control the operation of the heater 2130. The control unit 120 may control an amount of power supplied to the heater 2130 and a time for supplying the power, such that the heater 2130 may be heated to a predetermined temperature or maintained at a proper temperature. The controller 120 may also check the status of the battery 110 (e.g., the remaining amount of the battery 110) and generate a notification signal as occasions demand.

Also, the controller 120 may check the presence or absence of a user's puff, check the strength of the puff, and count the number of puffs. Also, the controller 120 may continuously check the time during which the holder 1 is operating. The controller 120 may also check whether a cradle 2 to be described below is coupled with the holder 1 and control the operation of the holder 1 based on whether the cradle 2 is coupled with or separated from and the holder 1.

Meanwhile, the holder 1 may further include general-purpose components other than the battery 110, the control unit 120, and the heater 2130.

For example, the holder 1 may include a display capable of outputting visual information or a motor for outputting tactile information. For example, when a display is included in the holder 1, the control unit 120 may provide, via the display, a user with information about the state of the holder 1 (e.g., availability of the holder, etc.), information about the heater 2130 (e.g., start of preheating, progress of preheating, completion of preheating, etc.), information about the battery 110 (e.g., remaining power of the battery 110, availability, etc.), information about resetting of the holder 1 (e.g., reset timing, reset progress, reset completion, etc.), information about cleaning of the holder 1 (e.g., cleaning timing, cleaning progress, cleaning completion, etc.), information about charging of the holder 1 (e.g., need of charging, charging progress, charging completed, etc.), information about puff (e.g., the number of puffs, notification of expected completion of puffs, etc.), or information about safety (e.g., time of use, etc.). In another example, when a motor is included in the holder 1, the controller 120 may transmit the above-described information to a user by generating a vibration signal by using the motor.

The holder 1 may also include a terminal coupled with at least one input device (e.g., a button) and/or the cradle 2 through which a user may control the function of the holder 1. For example, a user may perform various functions by using the input device of the holder 1. By adjusting the number of times a user presses the input device (e.g., once, twice, etc.) or the time during which the input device is being pressed (e.g., 0.1 second, 0.2 second, etc.), a desired function from among a plurality of functions of the holder 1 may be executed. As a user manipulates the input device, the holder 1 may perform a function of preheating the heater 2130, a function of regulating the temperature of the heater 2130, a function of cleaning the space in which a cigarette is inserted, a function of checking whether the battery 110 is in an operable state, a function of displaying the remaining power (available power) of the battery 110, a function of resetting the holder 1, etc. However, the functions of the holder 1 are not limited to the examples described above.

The holder 1 may also include a puff detecting sensor, a temperature sensing sensor, and/or a cigarette insertion detecting sensor. For example, a puff detecting sensor may be implemented using a typical pressure sensor, and a cigarette insertion detecting sensor may be implemented using a typical capacitive sensor or a resistance sensor. Also, the holder 1 may be fabricated to have a structure in which the outside air may flow in/out even in the state where the cigarette is inserted.

Figure 12A:
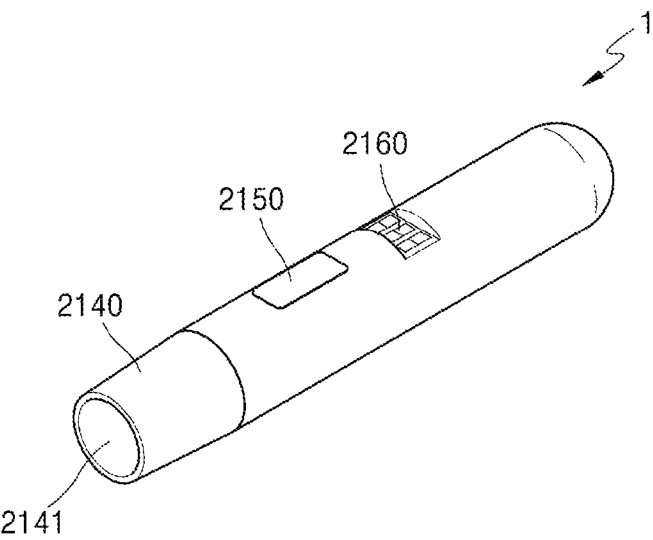
FIGS. 12A and 12B are diagrams showing various views of an example of a holder.
Figure 12B:
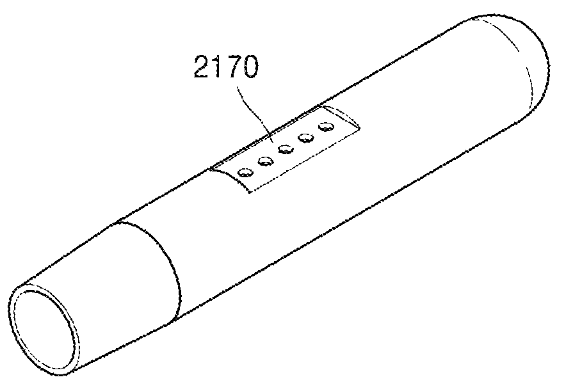

FIGS. 12A and 12B are diagrams showing various views of an example of a holder.

FIG. 12A is a diagram showing an example of the holder 1 viewed in a first direction. As shown in FIG. 12A, the holder 1 may be fabricated to have a cylindrical shape, but the present disclosure is not limited thereto. The casing 2140 of the holder 1 may be separated by an action of a user and a cigarette may be inserted into an terminal end 2141 of the casing 140. The holder 1 may also include a button 2150 for a user to control the holder 1 and a display 2160 for outputting an image. The casing 2140 may be an embodiment of the casing described above.

FIG. 12B is a diagram showing an example of the holder 1 viewed in a second direction. The holder 1 may include a terminal 2170 coupled with the cradle 2. As the terminal 2170 of the holder 1 is coupled with a terminal 2260 of the cradle 2, the battery 110 of the holder 1 may be charged by power supplied by a battery 210 of the cradle 2. Also, the holder 1 may be operated by power supplied from the battery 210 of the cradle 2 through the terminal 2170 and the terminal 2260 and a communication (transmission/reception of signals) may be performed between the holder 1 and the cradle 2 through the terminal 2170 and the terminal 2260. For example, the terminal 2170 may include four micro pins, but the present disclosure is not limited thereto.

Figure 13:
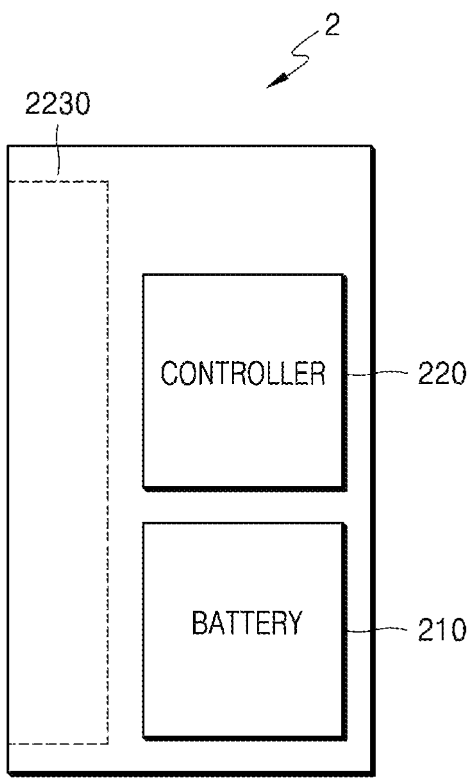
FIG. 13 is a diagram showing an example configuration of a cradle.

FIG. 13 is a diagram showing an example configuration of a cradle.

Referring to FIG. 13, the cradle 2 includes the battery 210 and a control unit 220. The cradle 2 also includes an inner space 2230 into which the holder 1 may be inserted. For example, the inner space 2230 may be formed on one side of the cradle 2. Therefore, the holder 1 may be inserted and fixed in the cradle 2 even when the cradle 2 does not include a separate lid.

Only components of the cradle 2 related to the present embodiment are shown in FIG. 13. Therefore, it will be understood by one of ordinary skill in the art that general-purpose components other than the components shown in FIG. 13 may be further included in the cradle 2.

The battery 210 provides power used to operate the cradle 2. In addition, the battery 210 may supply power for charging the battery 110 of the holder 1. For example, when the holder 1 is inserted into the cradle 2 and the terminal 2170 of the holder 1 is coupled with the terminal 2260 of the cradle 2, the battery 210 of the cradle 2 may supply power to the battery 110 of the holder 1.

Also, when the holder 1 is coupled with the cradle 2, the battery 210 may supply power used for the holder 1 to operate. For example, when the terminal 2170 of the holder 1 is coupled with the terminal 2260 of the cradle 2, the holder 1 may operate by using power supplied by the battery 210 of the cradle 2 regardless of whether the battery 110 of the holder 1 is discharged or not.

Examples of the type of the battery 210 may be the same as the examples of the battery 110 described with reference to FIG. 11. The capacity of the battery 210 may be greater than the capacity of the battery 110. For example, the capacity of the battery 210 may be, but is not limited to, 3000 mAh or greater.

The control unit 220 generally controls the overall operation of the cradle 2. The control unit 220 may control the overall operation of all the configurations of the cradle 2. The control unit 220 may also determine whether the holder 1 is coupled with the cradle 2 and control the operation of the cradle 2 according to coupling or separation of the cradle 2 and the holder 1.

For example, when the holder 1 is coupled with the cradle 2, the control unit 220 may supply power of the battery 210 to the holder 1, thereby charging the battery 110 or heating the heater 2130. Therefore, even when remaining power of the battery 110 is low, a user may continuously smoke by coupling the holder 1 with the cradle 2.

The controller 120 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

Meanwhile, the cradle 2 may further include general-purpose components other than the battery 210 and the control unit 220. For example, cradle 2 may include a display capable of outputting visual information. For example, when the cradle 2 includes a display, the control unit 220 generates a signal to be displayed on the display, thereby informing a user information regarding the battery 210 (e.g., the remaining power of the battery 210, availability of the battery 210, etc.), information regarding resetting of the cradle 2 (e.g., reset timing, reset progress, reset completion, etc.), information regarding cleaning of the holder 1 (e.g., cleaning timing, cleaning necessity, cleaning progress, cleaning completion, etc.), information regarding charging of the cradle 2 (e.g., charging necessity, charging progress, charging completion, etc.). The display may be an embodiment of the output unit 140 described above.

The cradle 2 may also include at least one input device (e.g., a button) for a user to control the function of the cradle 2, a terminal 2260 to be coupled with the holder 1, and/or an interface for charging the battery 210 (e.g., an USB port, etc.).

For example, a user may perform various functions by using the input device of the cradle 2. By controlling the number of times that a user presses the input device or a period of time for which the input device is pressed, a desired function from among the plurality of functions of the cradle 2 may be executed. As a user manipulates the input device, the cradle 2 may perform a function of preheating the heater 2130 of the holder 1, a function of regulating the temperature of the heater 2130 of the holder 1, a function of cleaning the space in the holder 1 in which a cigarette is inserted, a function of checking whether the cradle 2 is in an operable state, a function of displaying the remaining power (available power) of the battery 210 of the cradle 2, a function of resetting the cradle 2, etc. However, the functions of the cradle 2 are not limited to the examples described above.

Figure 14A:
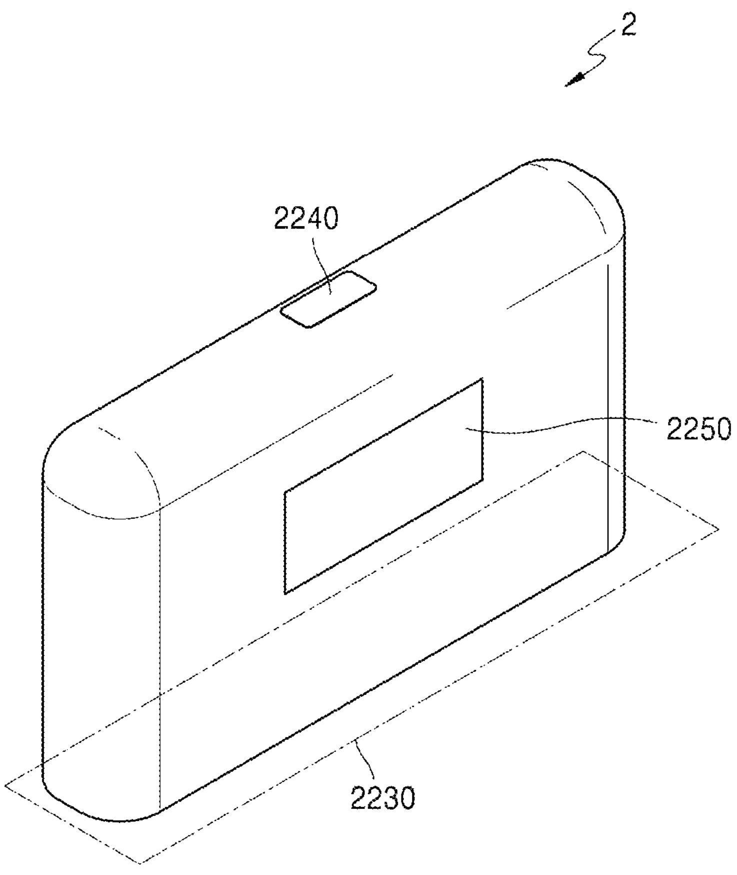
FIGS. 14A and 14B are diagrams showing various views of an example of a cradle.
Figure 14B:
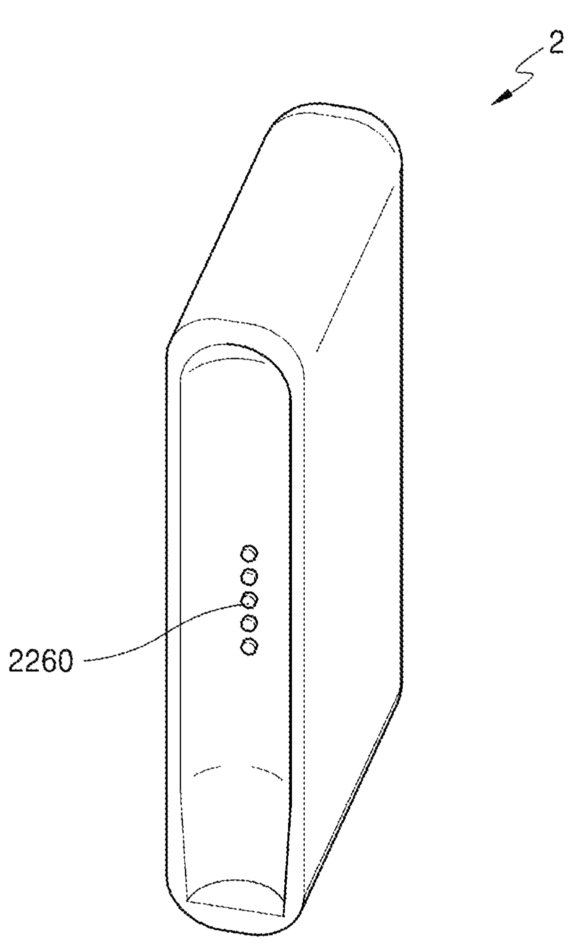

FIGS. 14A and 14B are diagrams showing various views of an example of a cradle.

FIG. 14A is a diagram showing an example of the cradle 2 viewed in a first direction. The inner space 2230 into which the holder 1 may be inserted may be formed on one side of the cradle 2. Also, the holder 1 may be inserted and fixed in the cradle 2 even when the cradle 2 does not include a separate fixing unit like a lid. The cradle 2 may also include a button 2240 for a user to control the cradle 2 and a display 2250 for outputting an image.

FIG. 14B is a diagram showing an example of the cradle 2 viewed in a second direction. The cradle 2 may include a terminal 2260 to be coupled with the inserted holder 1. The battery 110 of the holder 1 may be charged by power supplied by the battery 210 of the cradle 2 as the terminal 2260 is coupled with the terminal 2170 of the holder 1. Also, the holder 1 may be operated by power supplied from the battery 210 of the cradle 2 through the terminal 2170 and the terminal 2260 and transmission/reception of signals may be performed between the holder 1 and the cradle 2 through the terminal 2170 and the terminal 2260. For example, the terminal 2260 may include four micro pins, but the present disclosure is not limited thereto.

The holder 1 may be inserted into the inner space 2230 of the cradle 2, as described above with reference to FIGS. 11 to 14B. The holder 1 may be completely inserted into the cradle 2 or may be tilted while being inserted into the cradle 2. Hereinafter, examples in which the holder 1 is inserted into the cradle 2 will be described with reference to FIGS. 15 to 17B.

Figure 15:
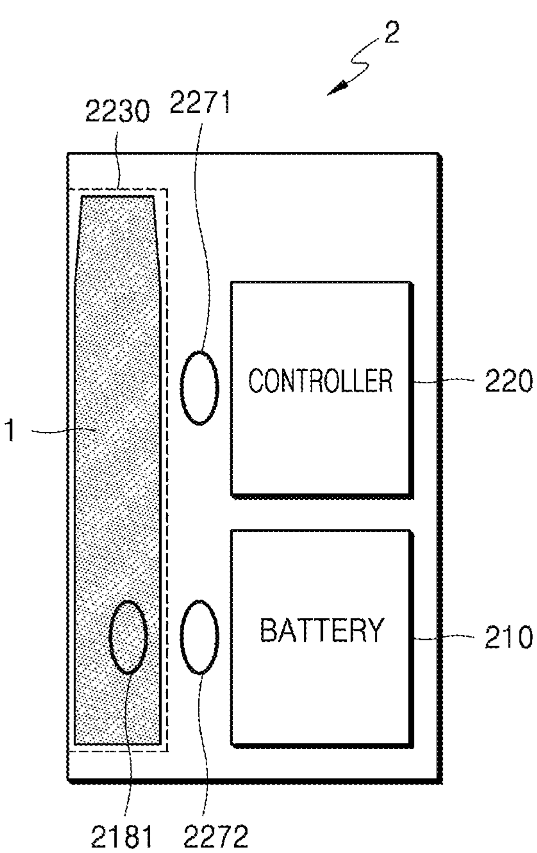
FIG. 15 is a diagram showing an example in which a holder is inserted into a cradle.

FIG. 15 is a diagram showing an example in which a holder is inserted into a cradle.

Referring to FIG. 15, an example in which the holder 1 is inserted into the cradle 2 is shown. Since the space 2230 into which the holder 1 is to be inserted is present on one side surface of the cradle 2, the inserted holder 1 may not be exposed to the outside by the other side surfaces of the cradle 2. Therefore, the cradle 2 may not include another component (e.g., a lid) for not exposing the holder 1 to the outside.

The cradle 2 may include at least one attaching member 2271 and/or 2272 to increase attachment strength with the holder 1. Also, at least one attaching member 2181 may be included in the holder 1 as well. Here, attaching members 2181, 2271, and 2272 may be magnets, but are not limited thereto. Although FIG. 15 shows that the holder 1 includes one attaching member 2181 and the cradle 2 includes two attaching members 2271 and 2272 for convenience of explanation, the number of the attaching members 2181, 2271, and 2272 is not limited thereto.

The holder 1 may include the attaching member 2181 at a first position and the cradle 2 may include the attaching members 2271 and 2272 at a second position and a third position, respectively. In this case, the first position and the third position may be positions facing each other when the holder 1 is inserted into the cradle 2.

Since the attaching members 2181, 2271, and 2272 are included in the holder 1 and the cradle 2, the holder 1 and the cradle 2 may be attached to each other more strongly even when the holder 1 is inserted into one side surface of the cradle 2. In other words, as the holder 1 and the cradle 2 further include the attaching members 2181, 2271, and 2272 in addition to the terminals 2170 and 2260, the holder 1 and the cradle 2 may be attached to each other more strongly. Therefore, even when there is no separate component (e.g., a lid) in the cradle 2, the inserted holder 1 may not be easily separated from the cradle 2.

Also, when the control unit 220 also determines that the holder 1 is completely inserted into the cradle 2 through the terminals 2170 and 2260 and/or the attaching members 2181, 2271, and 2272, the control unit 2220 may charge the battery 110 of the holder 1 by using power of the battery 210.

Figure 16:
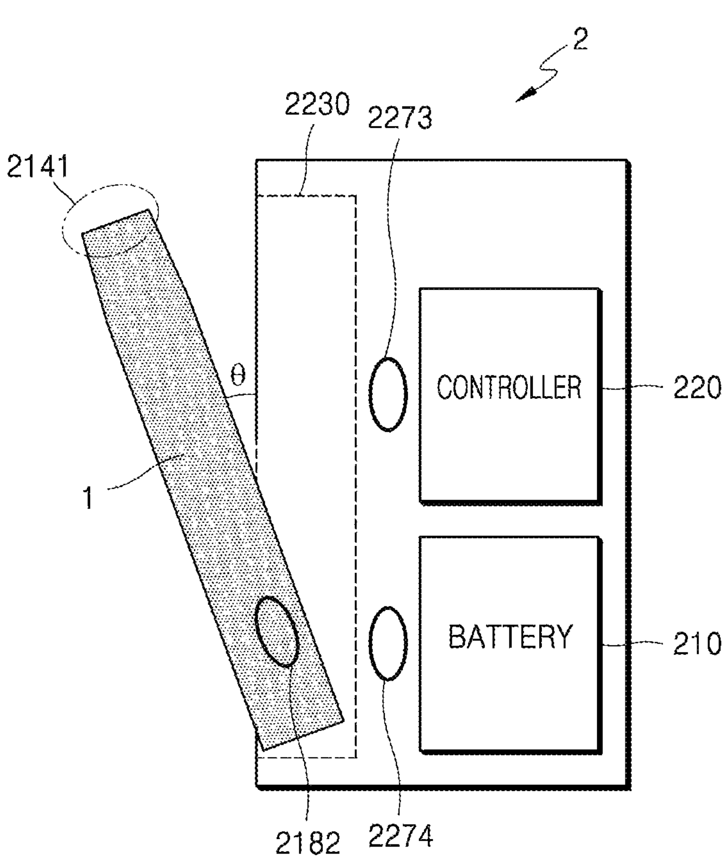
FIG. 16 is a diagram showing an example in which a holder is tilted while being inserted into a cradle.

FIG. 16 is a diagram showing an example in which a holder is tilted while being inserted into a cradle.

Referring to FIG. 16, the holder 1 is tilted inside the cradle 2. Here, the term 'tilting' indicates that the holder 1 is inclined at a certain angle in a state while the holder 1 is being inserted into the cradle 2.

As shown in FIG. 15, when the holder 1 is completely inserted into the cradle 2, a user may not smoke. In other words, once the holder 1 is completely inserted into the cradle 2, a cigarette may not be inserted into the holder 1. Therefore, when the holder 1 is completely inserted into the cradle 2, a user may not smoke.

As shown in FIG. 16, when the holder 1 is tilted, the terminal end 2141 of the holder 1 is exposed to the outside. Therefore, the user may insert a cigarette into the terminal end 2141 and smoke generated aerosol. A sufficient tilting angle θ may be secured to prevent a cigarette from being bent or damaged when the cigarette is inserted into the terminal end 2141 of the holder 1. For example, the holder 1 may be tilted to the extent that an entire cigarette insertion hole included in the terminal end 2141 is exposed to the outside. For example, the range of the tilting angle θ may be greater than 0° and not greater than 180° and may preferably be not less than 10° and not greater than 90°. More preferably, the range of the tilting angle θ may be from 10° to 20°, from 10° to 30°, from 10° to 40°, from 10° to 50°, or from 10° to 60°.

Also, even when the holder 1 is tilted, the terminal 2170 of the holder 1 and the terminal 2260 of the cradle 2 are coupled with each other. Therefore, the heater 2130 of the holder 1 may be heated by power supplied by the battery 210 of the cradle 2. Therefore, the holder 1 may generate aerosol by using the battery 210 of the cradle 2 even when the remaining power of the battery 110 of the holder 1 is low or the battery 110 of the holder 1 is completely discharged.

FIG. 16 shows an example in which the holder 1 includes one attaching member 2182 and the cradle 2 includes two attaching members 2273 and 2274. For example, the respective positions of the attaching members 2182, 2273, and 2274 are as described above with reference to FIG. 15. Assuming that the attaching members 2182, 2273, and 2274 are magnets, the magnetic strength of the attaching member 2274 may be greater than the magnetic strength of the attaching member 2273. Therefore, the holder 1 may not be completely separated from the cradle 2 due to the attaching member 2182 and the attaching member 2274 even when the holder 1 is tilted.

Also, when it is determined that the holder 1 titled through the terminals 2170 and 2260 and/or the attaching members 2181, 2271, and 2272, the control unit 220 may heat the heater 2130 of the holder 1 or charge the battery 110 by using power of the battery 210.

Figure 17A:
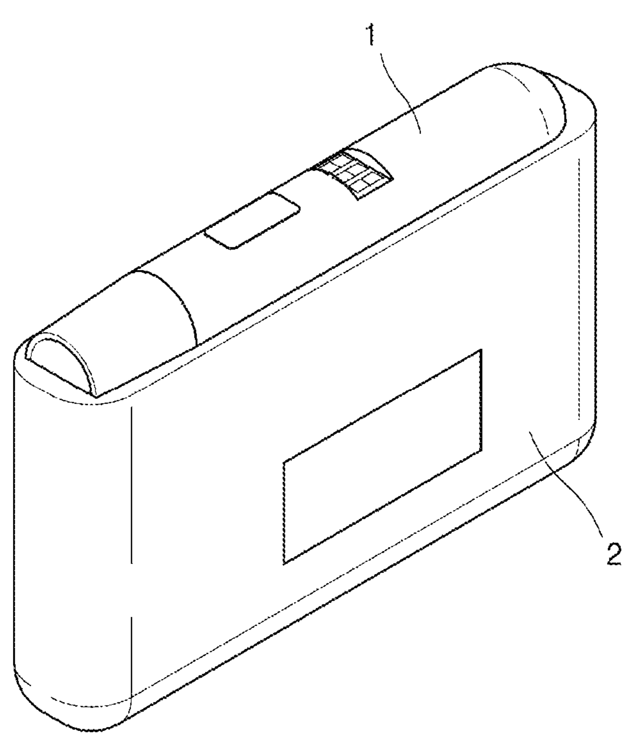
FIGS. 17A to 17B are diagrams showing examples in which a holder is inserted into a cradle.
Figure 17B:
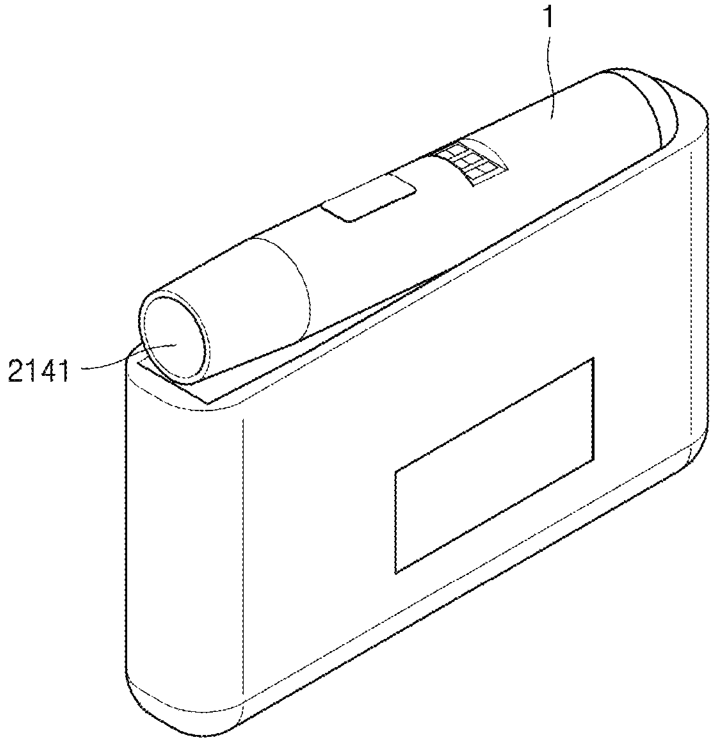

FIGS. 17A to 17B are diagrams showing examples in which a holder is inserted into a cradle.

FIG. 17A shows an example in which the holder 1 is completely inserted into the cradle 2. The cradle 2 may be fabricated to provide the sufficient inner space 2230 of the cradle 2 to minimize the contact of a user with the holder 1 when the holder 1 is completely inserted into the cradle 2. When the holder 1 is completely inserted into the cradle 2, the control unit 220 supplies power of the battery 210 to the holder 1, such that the battery 110 of the holder 1 is charged.

FIG. 17B shows an example in which the holder 1 is tilted while being inserted into the cradle 2. When the holder 1 is tilted, the control unit 220 supplies power of the battery 210 to the holder 1, such that the battery 110 of the holder 1 is charged or the heater 2130 of the holder 1 is heated FIG. 18 is a flowchart for describing an example in which a holder and a cradle operates.

Figure 18:
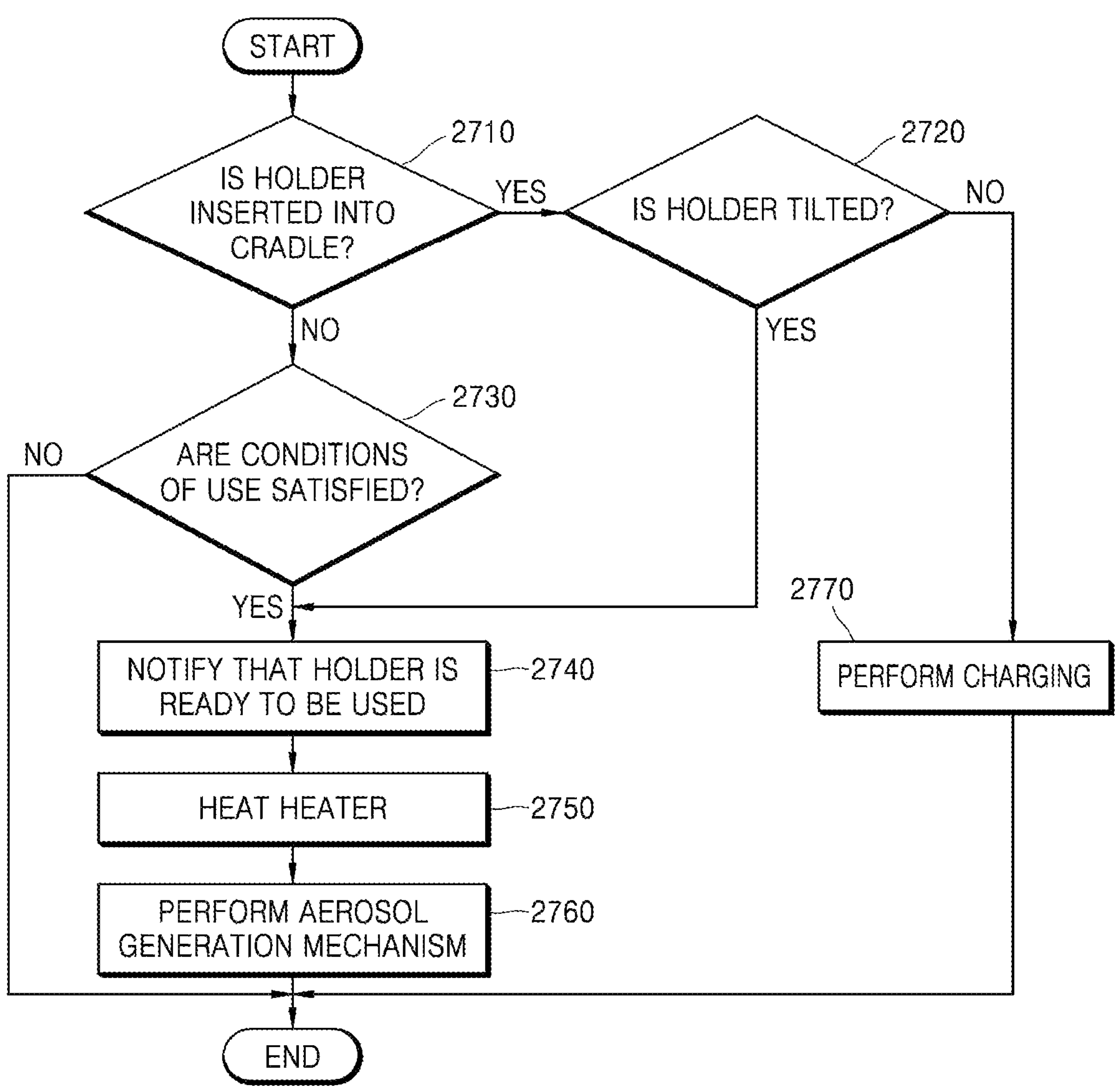
FIG. 18 is a flowchart for describing an example in which a holder and a cradle operate.

A method for generating aerosols shown in FIG. 18 includes operations that are performed in a time-series manner by the holder 1 shown in FIG. 11 or the cradle 2 shown in FIG. 13. Therefore, it will be understood that the descriptions given above with respect to the holder 1 shown in FIG. 11 and the cradle 2 shown in FIG. 13 also apply to the method of FIG. 18, even when the descriptions are omitted below.

In operation 2170, the holder 1 determines whether it is inserted in the cradle 2. For example, the control unit 120 may determine whether the holder 1 is inserted into the cradle 2 based on whether the terminals 2170 and 2260 of the holder 1 and the cradle 2 are connected to each other and/or whether the attaching members 2181, 2271, and 2272 are operating.

When the holder 1 is inserted into the cradle 2, the method proceeds to operation 2720. When the holder 1 is separated from the cradle 2, the method proceeds to operation 2730.

In operation 2720, the cradle 2 determines whether the holder 1 is tilted. For example, the control unit 220 may determine whether the holder 1 is inserted into the cradle 2 based on whether the terminals 2170 and 2260 of the holder 1 and the cradle 2 are connected to each other and/or whether attaching members 2182, 2273, and 2274 are operating.

Although it is described that the cradle 2 determines whether the holder 1 is tilted in operation 2720, the present disclosure is not limited thereto. In other words, the controller 120 of the holder 1 may determine whether the holder 1 is tilted.

When the holder 1 is tilted, the method proceeds to operation 2740. When the holder 1 is not tilted (i.e., the holder 1 is completely inserted into the cradle 2), the method proceeds to operation 2770.

In operation 2730, the holder 1 determines whether conditions of using the holder 1 are satisfied. For example, the controller 120 may determine whether the conditions for using the holder 1 are satisfied by checking whether the remaining power of the battery 110 and whether other components of the holder 1 may be normally operated.

When the conditions for using the holder 1 are satisfied, the method proceeds to operation 2740. Otherwise, the method is terminated.

In operation 2740, the holder 1 informs a user that the holder 1 is ready to be used. For example, the controller 120 may output an image indicating that the holder 1 is ready to be used on the display of the holder 1 or may control the motor of the holder 1 to generate a vibration signal.

In operation 2750, the heater 2130 is heated. For example, when the holder 1 is separated from the cradle 2, the heater 2130 may be heated by power of the battery 110 of the holder 1. In another example, when the holder 1 is tilted, the heater 2130 may be heated by power of the battery 210 of the cradle 2.

The control unit 120 of the holder 1 or the control unit 220 of the cradle 2 may check the temperature of the heater 2130 in real time and control an amount of power supplied to the heater 2130 and a time for supplying the power to the heater 2130. For example, the control unit 120 or 220 may check the temperature of the heater 2130 in real time through a temperature sensor included in the holder 1 or an electrically conductive track of the heater 2130.

In operation 2760, the holder 1 performs an aerosol generation mechanism. For example, the control unit 120, 220 may check the temperature of the heater 2130, which changes as a user performs puffs, and adjust an amount of power supplied to the heater 2130 or stop supplying power to the heater 2130. Also, the controller 120 or 220 may count the number of puffs of the user and output information indicating that the holder 1 needs to be cleaned when the number of puffs reaches a certain number of times (e.g., 1500).

In operation 2770, the cradle 2 performs charging of the holder 1. For example, the control unit 220 may charge the holder 1 by supplying power of the battery 210 of the cradle 2 to the battery 110 of the holder 1.

Meanwhile, the controller 120 or 220 may stop the operation of the holder 1 according to the number of puffs of the user or the operation time of the holder 1. Hereinafter, an example in which the control unit 120 or 220 stops the operation of the holder 1 will be described with reference to FIG. 19.

Figure 19:
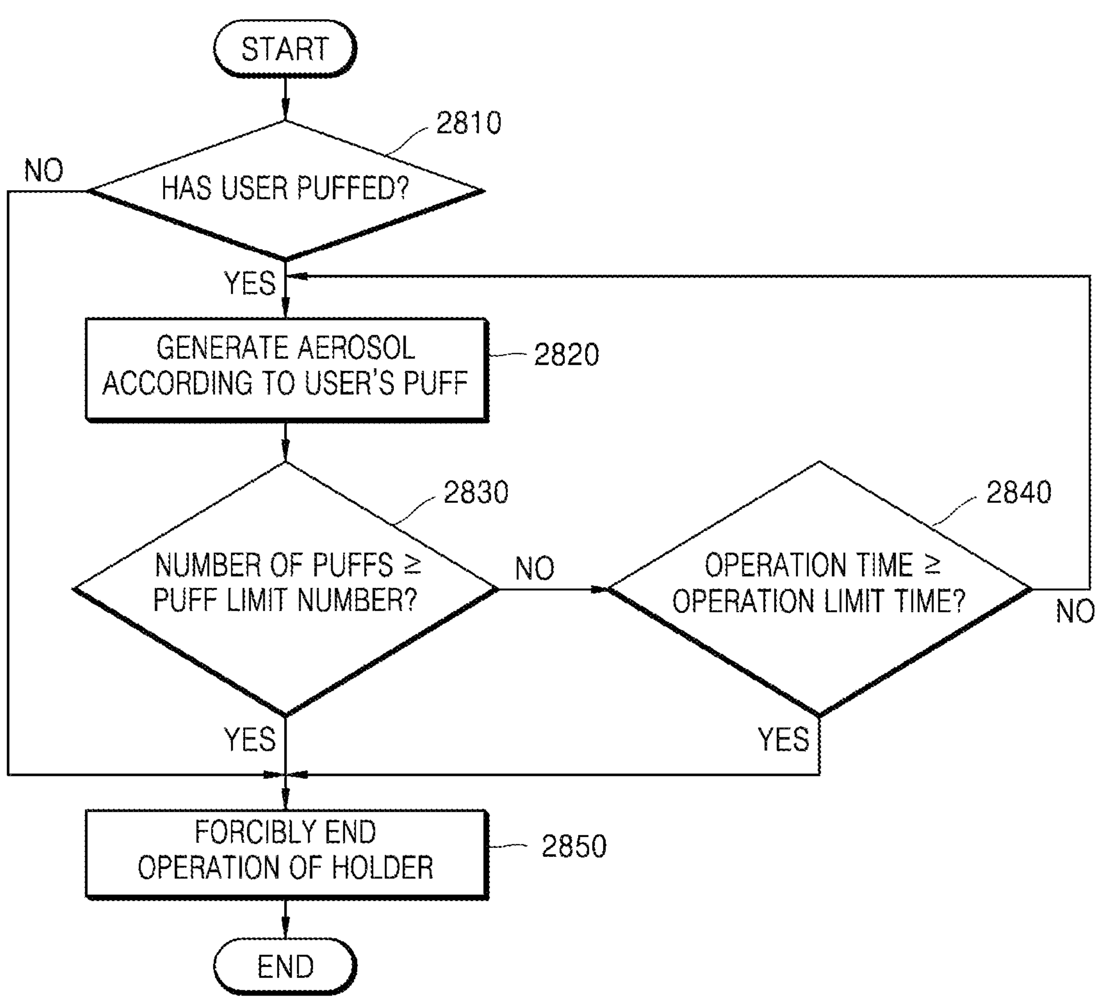
FIG. 19 is a flowchart for describing another example in which a holder operates.

FIG. 19 is a flowchart for describing another example in which a holder operates.

A method for generating aerosols shown in FIG. 19 includes operations that are performed in a time-series manner by the holder 1 shown in FIG. 11 and the cradle 2 shown in FIG. 3. Therefore, it will be understood that the descriptions given above with respect to the holder 1 shown in FIG. 15 or the cradle 2 shown in FIG. 3 also apply to the method of FIG. 19, even when the descriptions are omitted below.

In operation 2810, the control unit 120 or 220 determines whether a user puffed. For example, the controller 120 or 220 may determine whether the user puffed through the puff detecting sensor included in the holder 1.

In operation 2820, aerosol is generated according to the puff of the user. The control unit 120 or 220 may adjust power supplied to the heater 2130 according to the puff of the user and the temperature of the heater 2130, as described above with reference to FIG. 18. Also, the controller 120 or 220 counts the number of puffs of the user.

In operation 2830, the control unit 120 or 220 determines whether the number of puffs of the user is equal to or greater than a puff limit number. For example, assuming that the puff limit number is set to 14, the controller 120 or 220 determines whether the number of counted puffs is 14 or more.

On the other hand, when the number of puffs of the user is close to the puff limit number (e.g., when the number of puffs of the user is 12), the controller 120 or 220 may output a warning signal through a display or a vibration motor.

When the number of puffs of the user is equal to or greater than the puff limit number, the method proceeds to operation 2850. When the number of puffs of the user is less than the puff limit number, the method proceeds to operation 2840.

In operation 2840, the control unit 120 or 220 determines whether the operation time of the holder 1 is equal to or greater than an operation limit time. Here, the operation time of the holder 1 refers to accumulated time from a time point at which the holder 1 started its operation to a current time point. For example, assuming that the operation limit time is set to 10 minutes, the controller 120 or 220 determines whether the holder 1 is operating for 10 minutes or longer.

On the other hand, when the operation time of the holder 1 is close to the operation limit time (e.g., when the holder 1 is operating for 8 minutes), the controller 120 or 220 may output a warning signal through a display or a vibration motor.

When the holder 1 is operating for the operation limit time or longer, the method proceeds to operation 2850. When the operation time of the holder 1 is less than the operation limit time, the method proceeds to operation 2820.

In operation 2850, the control unit 120 or 220 forcibly terminates the operation of the holder 1. In other words, the controller 120 or 220 terminates the aerosol generation mechanism of the holder 1. For example, the control unit 120 or 220 may forcibly terminate the operation of the holder 1 by interrupting the power supplied to the heater 2130.

Figure 20:
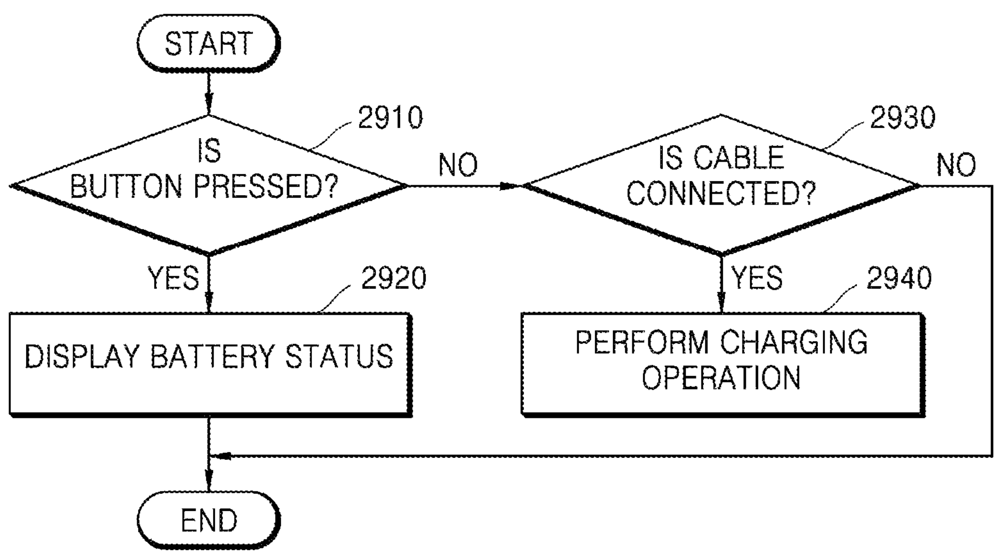
FIG. 20 is a flowchart for describing an example in which a cradle operates.

FIG. 20 is a flowchart for describing an example in which a cradle operates.

The flowchart shown in FIG. 20 includes operations that are performed in a time-series manner by the cradle 2 shown in FIG. 3. Therefore, it will be understood that the descriptions given above with respect to the cradle 2 shown in FIG. 3 also apply to the method of FIG. 20, even when the descriptions are omitted below.

Although not shown in FIG. 20, the operation of the cradle 2 to be described below may be performed regardless of whether the holder 1 is inserted into the cradle 2.

In operation 2910, the control unit 220 of the cradle 2 determines whether the button 2240 is pressed. When the button 2240 is pressed, the method proceeds to operation 2920. When the button 240 is not pressed, the method proceeds to operation 2930.

In operation 2920, the cradle 2 indicates the status of the battery. For example, the control unit 220 may output information regarding the current state of the battery 210 (e.g., remaining power, etc.) on the display 2250.

In operation 2930, the control unit 220 of the cradle 2 determines whether a cable is connected to the cradle 2. For example, the control unit 220 determines whether a cable is connected to an interface (e.g., a USB port, etc.) included in the cradle 2. When a cable is connected to the cradle 2, the method proceeds to operation 2940. Otherwise, the method is terminated.

In operation 2940, the cradle 2 performs a charging operation. For example, the cradle 2 charges the battery 210 by using power supplied through a connected cable.

As described above with reference to FIG. 11, a cigarette may be inserted into the holder 1. The cigarette includes an aerosol generating material and aerosol is generated by the heated heater 2130.

Hereinafter, an example of a cigarette that may be inserted into the holder 1 will be described with reference to FIGS. 21 to 23F.

Figure 21:
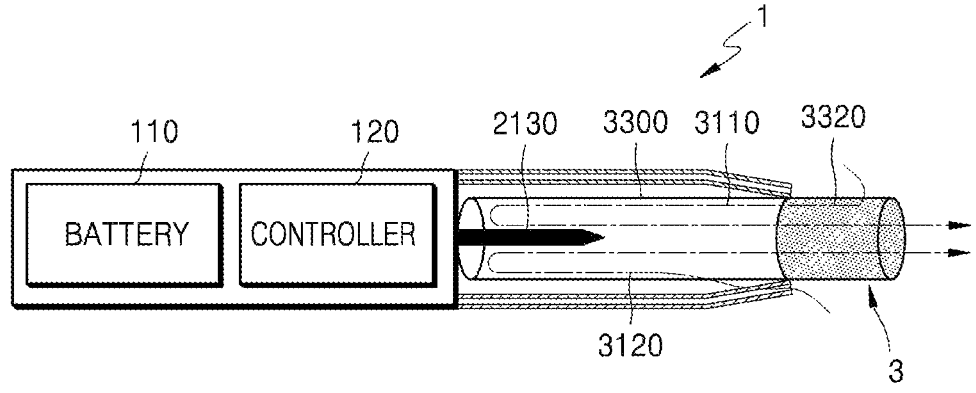
FIG. 21 is a diagram showing an example in which a cigarette is inserted into a holder.

FIG. 21 is a diagram showing an example in which a cigarette is inserted into a holder.

Referring to FIG. 21, the cigarette 3 may be inserted into the holder 1 through the terminal end 2141 of the casing 2140. When the cigarette 3 is inserted into the holder 1, the heater 2130 is located inside the cigarette 3. Therefore, the heated heater 2130 heats the aerosol generating material of the cigarette 3, thereby generating aerosol.

The cigarette 3 may be similar to a typical burning cigarette. For example, the cigarette 3 may include a first portion 3310 containing an aerosol generating material and a second portion 3320 including a filter and the like. Meanwhile, the cigarette 3 according to one embodiment may also include an aerosol generating material in the second portion 3320. For example, an aerosol generating material in the form of granules or capsules may be inserted into the second portion 3320.

The entire first portion 3310 may be inserted into the holder 1 and the second portion 3320 may be exposed to the outside. Alternatively, only a portion of the first portion 3310 may be inserted into the holder 1 or the entire first portion 3310 and a portion the second portion 3320 may be inserted into the holder 1.

A user may inhale the aerosol while holding the second portion 3320 by his/her lips. Here, the aerosol is mixed with the external and delivered to the lips of the user. As illustrated in FIG. 21, the external air may be introduced through at least one hole formed in a surface of the cigarette 3 (3110) or may be introduced through at least one air passage formed in the holder 1 (3120). For example, an air passage formed in the holder 1 may be manufactured to be opened or closed by a user.

Figure 22A:
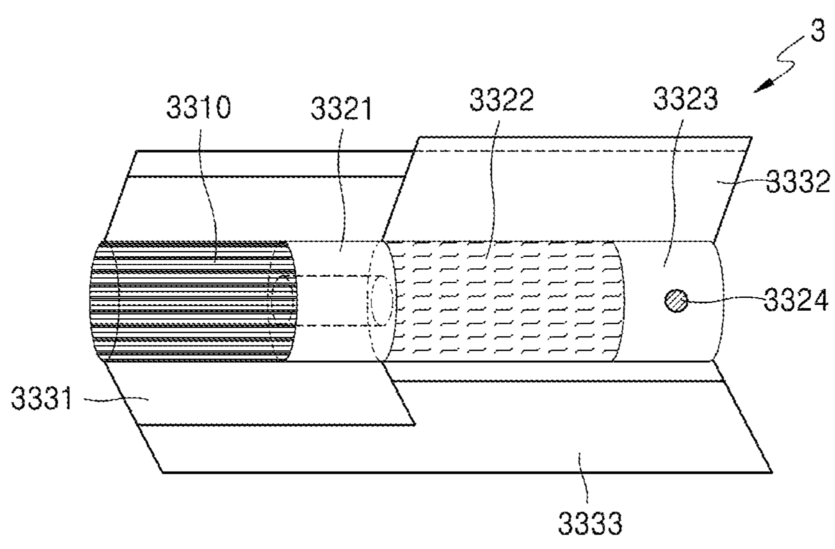
FIGS. 22A and 22B are block diagrams showing examples of a cigarette.
Figure 22B:
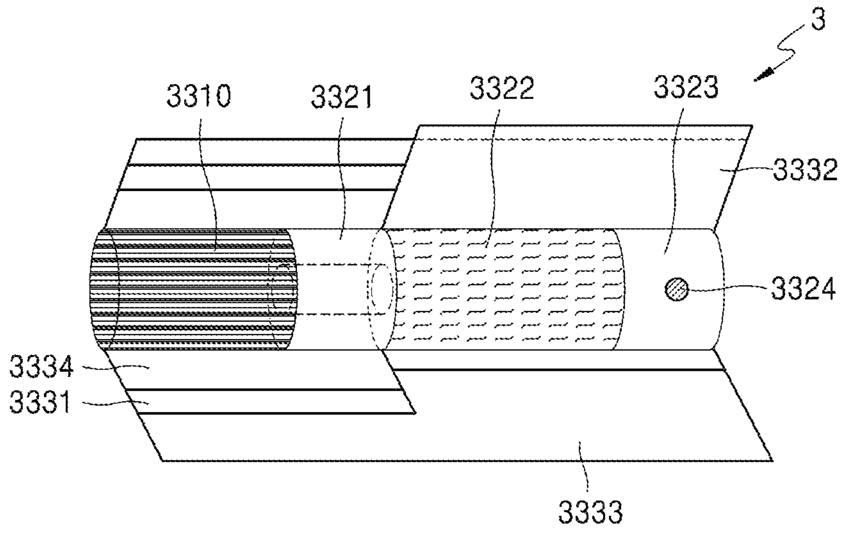

FIGS. 22A and 22B are block diagrams showing examples of a cigarette.

Referring to FIGS. 22A and 22B, the cigarette 3 includes a tobacco rod 3300, a first filter segment 3321, a cooling structure 3322, and a second filter segment 3323. The first portion 3310 described above with reference to FIG. 21 includes the tobacco rod 3300, and the second portion 3320 includes the first filter segment 3321, the cooling structure 3322, and the second filter segment 3323.

When comparing FIGS. 22A and 22B with each other, the cigarette 3 of FIG. 22B further includes a fourth wrapper 3334 compared with the cigarette 3 of FIG. 22A.

However, the structures of the cigarette 3 shown in FIGS. 22A and 22B are merely examples, and some of the components may be omitted. For example, the cigarette 3 may not include one or more of the first filter segment 3321, the cooling structure 3322, and the second filter segment 3323.

The tobacco rod 3300 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol. A length of the tobacco rod 3300 may be about 7 mm to about 15 mm, or preferably, about 12 mm. Also, a diameter of the tobacco rod 3300 may be 7 mm to 9 mm, or preferably, about 7.9 mm. The length and diameter of the tobacco rod 3300 are not limited to the above-described numerical range.

In addition, the tobacco rod 3300 may include other additive materials like a flavoring agent, a wetting agent, and/or an acetate compound. For example, the flavoring agent may include licorice, sucrose, fructose syrup, isosweet, cocoa, lavender, cinnamon, cardamom, celery, fenugreek, cascara, sandalwood, bergamot, geranium, honey essence, rose oil, vanilla, lemon oil, orange oil, mint oil, cinnamon, keragene, cognac, jasmine, chamomile, menthol, cinnamon, ylang ylang, *salvia*, spearmint, ginger, coriander, coffee, etc. In addition, the wetting agent may include glycerin or propylene glycol.

For example, the tobacco rod 3300 may be filled with cut tobacco leaves. Here, cut tobacco leaves may be formed by pulverizing a tobacco sheet.

For a large wide tobacco sheet to be filled within the tobacco rod 3300 having a narrow space, a special operation for facilitating folding of the tobacco sheet is further needed. Therefore, it is easier to fill the tobacco rod 3300 with cut tobacco leaves compared to filling the tobacco rod 3300 with a tobacco sheet, and thus the productivity and the efficiency of the process for producing the tobacco rod 3300 may be improved.

In another example, the tobacco rod 3300 may be filled with a plurality of cigarette strands formed by fine-cutting a tobacco sheet. For example, the tobacco rod 3300 may be formed by combining a plurality of tobacco strands in the same direction (parallel to one another) or randomly. A tobacco strand may be manufactured in a rectangular parallelepiped shape having a horizontal length of 1 mm, a vertical length of 12 mm, and a thickness (height) of 0.1 mm, but is not limited thereto.

Compared to the tobacco rod 3300 filled with a cigarette sheet, the tobacco rod 3300 filled with tobacco strands may generate a greater amount of aerosol. In the case of filling the same space, compared to a tobacco sheet, tobacco strands ensure a wider surface area. A wider surface area indicates that an aerosol generating material has a greater chance of contacting the outside air. Therefore, when the tobacco rod 3300 is filled with tobacco strands, more aerosol may be generated as compared to the tobacco rod 3300 filled with a tobacco sheet.

Furthermore, when the cigarette 3 is separated from the holder 1, the tobacco rod 3300 filled with tobacco strands may be separated more easily than the tobacco rod 3300 filled with a tobacco sheet. Compared to a tobacco sheet, a frictional force generated by contact between tobacco strands and the heater 2130 is smaller. Therefore, when the tobacco rod 3300 is filled with tobacco strands, the tobacco rod 3300 may be more easily separated from the holder 1 than the tobacco rod 3300 filled with a tobacco sheet.

A tobacco sheet may be formed by pulverizing a tobacco raw material into a slurry form and then drying the slurry. For example, an aerosol generating material may be added to a slurry in 15 to 30%. The tobacco raw material may be tobacco leaf flakes, tobacco stems, tobacco dust generated during tobacco processing and/or main lateral strips of tobacco leaves. The tobacco sheet may also include other additives like wood cellulose fibers.

The first filter segment 3321 may be a cellulose acetate filter. For example, the first filter segment 3321 may have a tubular shape including a hollowness therein. A length of the first filter segment 3321 may be about 7 mm to about 15 mm, or preferably, about 7 mm. The length of the first filter segment 3321 may be shorter than about 7 mm, but may preferably have a length that does not damage the function of at least one cigarette element (for example, a cooling element, a capsule, an acetate filter or the like). The length of the first filter segment 3321 is not limited to the above-described numerical range. Meanwhile, the length of the first filter segment 3321 is extendable, and the total length of the cigarette 3 may be adjusted based on the length of the first filter segment 3321.

The second filter segment 3323 may also be a cellulose acetate filter. For example, the second filter segment 3323 may be fabricated as a recess filter with a hollow cavity, but is not limited thereto. A length of the second filter segment 3323 may be about 5 mm to about 15 mm, or preferably, about 12 mm. The length of the second filter segment 3323 is not limited to the above-described numerical range.

Also, the second filter segment 3323 may include at least one capsule 3324. Here, the capsule 3324 may have a structure in which a content liquid containing a flavoring material is wrapped with a film. For example, the capsule 3324 may have a spherical or cylindrical shape. The capsule 3324 may have a diameter of 2 mm, or preferably 2 to 4 mm.

The material for forming a film of the capsule 3324 may be starch and/or a gelling agent. For example, gelling gum or gelatin may be used as the gelling agent. Furthermore, a gelling auxiliary agent may be further used as a material for forming the film of the capsule 324. Here, as the gelling auxiliary agent, for example, a calcium chloride may be used. Furthermore, a plasticizer may be further used as a material for forming the film of the capsule 3324. As the plasticizer, glycerin and/or sorbitol may be used. Furthermore, a coloring agent may be further used as a material for forming the film of the capsule 3324.

For example, as a flavoring material included in the content liquid of the capsule 324, menthol, plant essential oil, and the like may be used. As a solvent of the flavoring material included in the content liquid, for example, a medium chain fatty acid triglyceride (MCT) may be used. Also, the content liquid may include other additives like a pigment, an emulsifying agent, a thickening agent, etc.

The cooling structure 3322 cools generated aerosol as the heater 2130 heats the tobacco rod 3300. Therefore, a user may inhale aerosol cooled to a suitable temperature. A length of the cooling structure 3322 may be about 10 mm to about 20 mm, or preferably, about 14 mm. The length of the cooling structure 3322 is not limited to the above-described numerical range.

For example, the cooling structure 3322 may be fabricated using polylactic acid. The cooling structure 3322 can be manufactured in various forms to increase the surface area thereof per unit area (i.e., surface area in contact with aerosol). Various examples of the cooling structure 3322 will be described below with reference to FIGS. 23A to 23F.

The tobacco rod 3300 and the first filter segment 3321 may be wrapped using a first wrapper 3331. For example, the first wrapper 3331 may be manufactured using a paper packaging material having oil resistance.

The cooling structure 3322 and the second filter segment 3323 may be wrapped using a second wrapper 3332. In addition, the entire cigarette 3 may be repackaged using a third wrapper 3333. For example, the second wrapper 3332 and the third wrapper 3333 may be manufactured using a general paper packaging material. Optionally, the second wrapper 3332 may be oil-resistant hard wrap or PLA-flavored paper. In addition, the second wrapper 3332 may wrap a portion of the second filter segment 3323 and additionally wrap the second filter segment 3323 and the cooling structure 3322.

Referring to FIG. 22B, the cigarette 3 may include a fourth wrapper 3334. At least one of the tobacco rod 3300 and the first filter segment 3321 may be wrapped using the fourth wrapper 3334. In other words, only the tobacco rod 3300 may be wrapped using the fourth wrapper 3334 or the tobacco rod 3300 and the first filter segment 3321 may be wrapped using the fourth wrapper 3334. For example, the fourth wrapper 3334 may be manufactured using a paper packaging material.

The fourth wrapper 3334 may be produced by applying (or coating) a predetermined material on one or both surfaces of a paper packaging material. Here, an example of the predetermined material may be, but is not limited to, silicon. Silicon exhibits characteristics like heat resistance with little change due to the temperature, oxidation resistance, resistances to various chemicals, water repellency, electrical insulation, etc. However, any material other than silicon may be applied to (or coated on) the fourth wrapper 3334 without limitation as long as the material exhibits the above-mentioned characteristics.

Meanwhile, while the cigarette 3 is illustrated in FIG. 22B to include both the first wrapper 2331 and the fourth wrapper 2334, the embodiments are not limited thereto. That is, the cigarette 3 may include one of the first wrapper 3331 and the fourth wrapper 3334.

The fourth wrapper 3334 may prevent burning of the cigarette 3. For example, when the tobacco rod 3300 is heated by the heater 2130, there is a possibility that the cigarette 3 is burned. In detail, when the temperature is raised to a temperature above the ignition point of any one of materials included in the tobacco rod 3300, the cigarette 3 may be burned. In this case, also, since the fourth wrapper 3334 includes an incombustible material, burning of the cigarette 3 may be prevented.

In addition, the fourth wrapper 3334 may prevent the holder 1 from being contaminated by materials generated in the cigarette 3. Through puffs of a user, liquid substances may be formed in the cigarette 3. For example, as the aerosol formed by the cigarette 3 is cooled by the outside air, liquid materials (e.g., moisture, etc.) may be formed. As the fourth wrapper 3334 wraps the the tobacco rod 3300 and/or the first filter segment 3321, liquid materials generated in the cigarette 3 may be prevented from being leaked out of the cigarette 3. Accordingly, the casing 2140 of the holder 1 and the like may be prevented from being contaminated by the liquid materials formed by the cigarette 3.

FIGS. 23A through 23F are views illustrating examples of cooling structures of a cigarette.

For example, the cooling structures illustrated in FIGS. 23A through 23F may be manufactured using fibers produced using pure polylactic acid (PLA).

For example, when manufacturing a cooling structure by charging a film (sheet), the film (sheet) may be crushed by the external impact. In this case, the aerosol cooling effect of the cooling structure is deteriorated.

As another example, when a cooling structure is manufactured through extrusion molding or the like, the process efficiency is lowered as operations such as cutting of a structure are added. Also, there are limits in manufacturing a cooling structure in various shapes.

As a cooling structure according to an embodiment is fabricated by using polylactic acid fibers (e.g., weaving), the risk of the cooling structure being deformed or losing their function due to an external impact may be reduced. Also, by changing the way of combining the fibers, the cooling structure having various shapes may be fabricated.

In addition, by manufacturing a cooling structure by using fibers, a surface area thereof contacting aerosol is increased. Accordingly, the aerosol cooling effect of the cooling structure may be further improved.

Figure 23A:
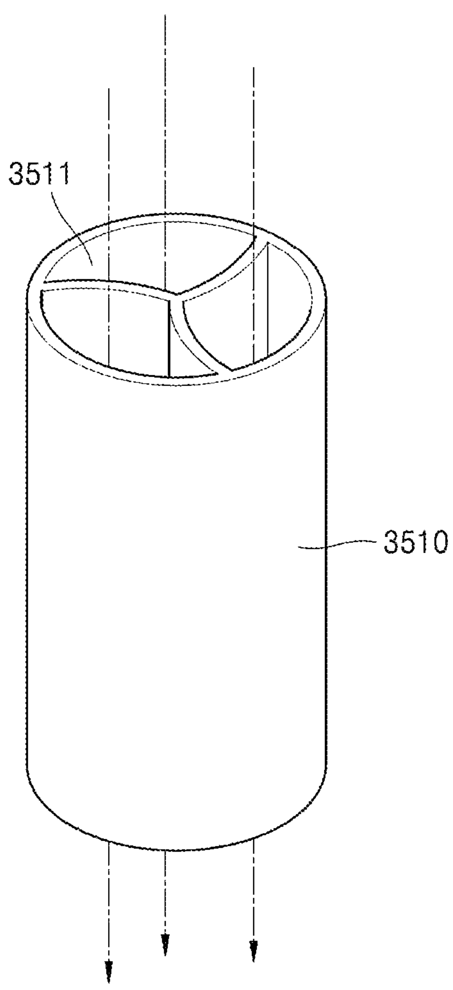
FIGS. 23A through 23F are views illustrating examples of cooling structures of a cigarette.

Referring to FIG. 23A, a cooling structure 3510 may be manufactured in a cylindrical shape, and at least one air path 3511 may be manufactured in a cross-section of the cooling structure 3510.

Figure 23B:
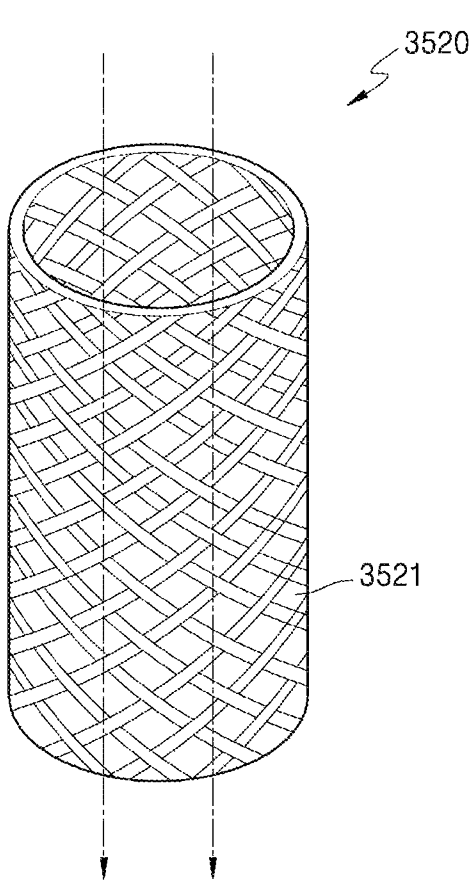

Referring to FIG. 23B, a cooling structure 3520 may be manufactured as a structure in which a plurality of fibers are entangled with each other. Here, aerosol may flow between the fibers, and a vortex may be formed depending on the shape of the cooling structure 3520. The vortex expands an area of contact of the aerosol in the cooling structure 3520 and increases the time that the aerosol stays in the cooling structure 3520. Therefore, heated aerosol may be effectively cooled.

Figure 23C:
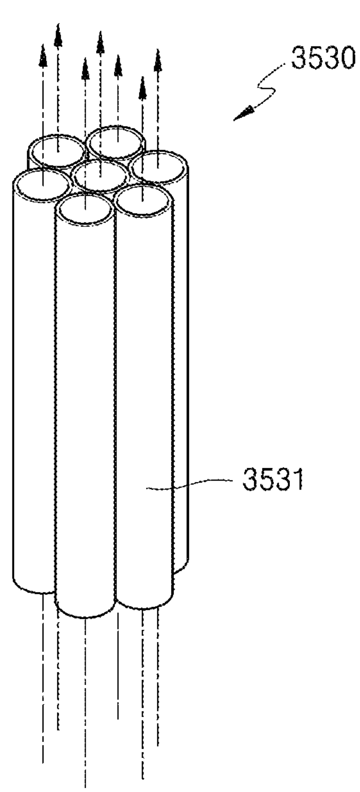

Referring to FIG. 23C, a cooling structure 3530 may be manufactured in a shape in which a plurality of bundles 3531 are gathered.

Figure 23D:
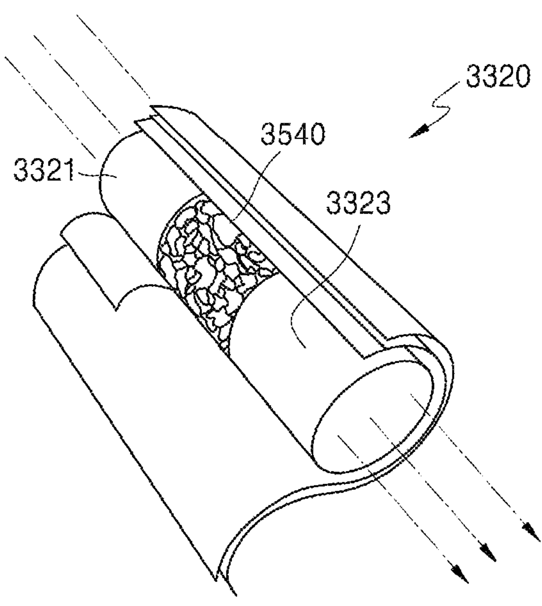

Referring to FIG. 23D, a cooling structure 3540 may be filled with granules formed of polylactic acid, cut leaves, or charcoal. Also, the granules may be fabricated by using a mixture of polylactic acid, cut leaves, and charcoal. On the other hand, the granules may further include an element capable of increasing the aerosol cooling effect other than polylactic acid, the cut leaves, and/or charcoal.

Figure 23E:
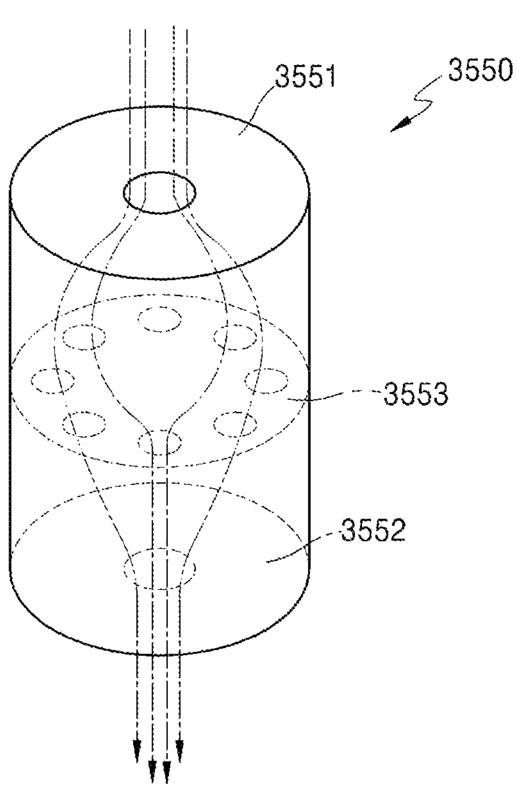

Referring to FIG. 23E, a cooling structure 3350 may include a first cross-section 3351 and a second cross-section 3352.

the first cross-section 3351 borders on the first filter segment 3321 and may include a gap through which aerosol is introduced. The second cross-section 3352 borders on the second filter segment 3323 and may include a gap through which aerosol may be discharged. For example, each of the first cross-section 3551 and the second cross-section 3552 may include a single gap having the same diameter, but the diameters and the numbers of the gaps included in the first cross-section 3551 and the second cross-section 3552 are not limited thereto.

In addition, the cooling structure 3550 may include a third cross-section 3553 including a plurality of gaps between the first cross-section 3551 and the second cross-section 3552. For example, the diameters of the plurality of gaps included in the third cross-section 3553 may be smaller than the diameters of the gaps included in the first cross-section 3551 and the second cross-section 3552. Also, the number of gaps included in the third cross-section 3553 may be greater than the number of gaps included in the first cross-section 3551 and the second cross-section 3552.

Figure 23F:
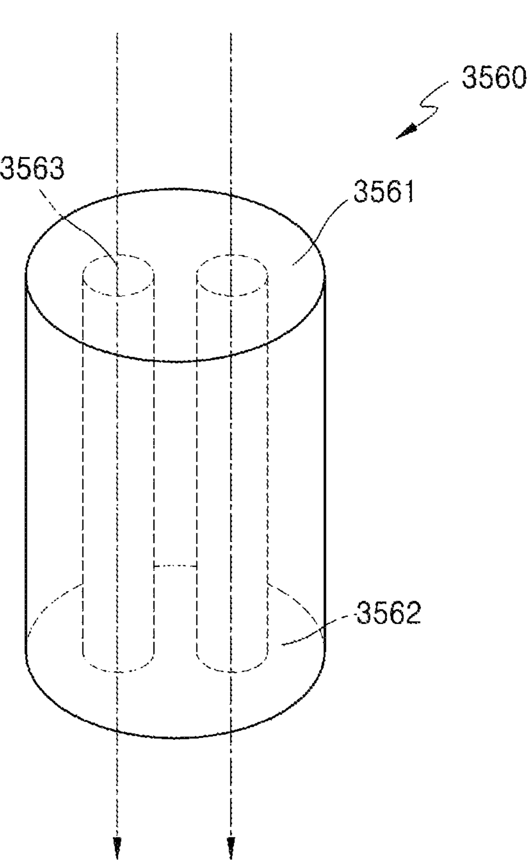

Referring to FIG. 23F, a cooling structure 3560 may include a first cross-section 3561 that borders on the first filter segment 3321 and a second cross-section 3562 that borders on the second filter segment 3323. Also, the cooling structure 3560 may include one or more tubular elements 3563. For example, the tubular element 3563 may pass through the first cross-section 3561 and the second cross-section 3562. Also, the tubular element 3563 may be packaged with a microporous packaging material and filled with a filler material (e.g., the granules described above with reference to FIG. 23D) that may increase the aerosol cooling effect.

As described above, the holder may generate aerosol by heating the cigarette. Also, aerosol may be generated independently by the holder or even when the holder is inserted into the cradle and is tilted. Particularly, when the holder is tilted, the heater may be heated by the power of a battery of the cradle.

In the drawings and description above, identical elements are labeled with different numerals according to the drawings and embodiments. However, it is apparent to those skilled in the art that the member numerals are only described differently for convenience according to embodiments and that the elements may be the same regardless of the numerals.

The device described herein may comprise a processor, a memory for storing and executing program data, a permanent storage device such as a disk drive, a communications port for handling communications with external devices, and user interface devices, including a touch panel, keys, buttons, etc. When software modules are involved, these software modules may be stored as program instructions or computer readable codes executable on the processor on a computer-readable media such as magnetic recording media (e.g., read-only memory (ROM), random-access memory (RAM), floppy disks, hard disks, etc.) and optical data storage media (e.g., CD-ROMs, Digital Versatile Disc (DVD)) or the like. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the present disclosure, reference has been made to the preferred embodiments illustrated in the drawings, and specific language has been used to describe these embodiments. However, no limitation of the scope of the present disclosure is intended by this specific language, and the present disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the present disclosure may be implemented with any programming or scripting language such as C, C++, Java, assembler, or the like, with the various algorithms being implemented with any combination of data structures, objects, processes, routines or other programming elements. Functional aspects may be implemented in algorithms executed on one or more processors. Furthermore, the present disclosure could employ conventional techniques for electronics configuration, signal processing and/or data processing and the like. The terms such as "mechanism", "element", "means", "configuration" are used broadly and are not limited to mechanical or physical embodiments, but can include software routines in conjunction with processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the present disclosure and does not pose a limitation on the scope of the present disclosure unless otherwise claimed. Numerous modifications and adaptations will be readily apparent to those skilled in this art without departing from the spirit and scope of the present disclosure.

What is claimed is:

1. An aerosol generating device comprising:

a heater configured to heat an aerosol generating material;

a sensor configured to detect a user's puff;

an output unit configured to provide feedback on the user's puff, and a controller configured to:

determine a remaining number of available puffs based on a detection result of the sensor, compare the remaining number of available puffs with a predetermined threshold, maintain a first output mode of the output unit based on determining the remaining number of available puffs is equal to or greater than the predetermined threshold, wherein a first output notification is provided to the user in the first output mode, and change the first output mode to a second output mode based on determining the remaining number of available puffs is less than the predetermined threshold, wherein a second output notification different from the first output notification is provided to the user in the second output mode.

2. The aerosol generating device of claim 1, wherein the sensor comprises a temperature sensor configured to measure a temperature of the heater, and the controller detects the user's puff based on a variation in the temperature of the heater by using the temperature sensor.

3. The aerosol generating device of claim 1, wherein the sensor comprises a flux sensor, and the controller detects the user's puff based on a variation in flux in the device by using the flux sensor.

4. The aerosol generating device of claim 1, wherein the first output mode outputs, as the first output notification, the number of the remaining number of available puffs through a visual output means including an LED display or an LED lamp in order to provide feedback on the user's puff.

5. The aerosol generating device of claim 4, wherein the second output mode, as the second output notification, provides feedback on the user's puff through a tactile output means including a vibration motor.

6. The aerosol generating device of claim 1, wherein the controller provides feedback on the user's puff through a visual output means including an LED display or an LED lamp and a tactile output means including a vibration motor based on determining the number of the remaining number of available puffs is less than the threshold value.

7. The aerosol generating device of claim 6, wherein at least one of an intensity or an interval of the visual output means and the tactile output means is set differently between the first output mode and the second output mode.

8. The aerosol generating device of claim 1, wherein the controller determines the number of available puffs based on the detection result of the sensor, power of the battery or an amount of an aerosol generating material.

9. The aerosol generating device of claim 1, wherein the controller stops the operation of a visual output means including an LED lamp and a tactile output means including a vibration motor based on determining the number of available puffs remaining is 0.

* * * * *